United States Patent
Hosoya et al.

(10) Patent No.: US 6,814,764 B2
(45) Date of Patent: Nov. 9, 2004

(54) METHOD FOR PRODUCING CATHODE ACTIVE MATERIAL AND METHOD FOR PRODUCING NON-AQUEOUS ELECTROLYTE CELL

(75) Inventors: Mamoru Hosoya, Kanagawa (JP); Yuzuru Fukushima, Miyagi (JP); Hideki Sakai, Kanagawa (JP); Junji Kuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 311 days.

(21) Appl. No.: 09/966,918

(22) Filed: Sep. 28, 2001

(65) Prior Publication Data

US 2002/0124386 A1 Sep. 12, 2002

(30) Foreign Application Priority Data

Oct. 6, 2000 (JP) ..................................... P2000-308300
Oct. 6, 2000 (JP) ..................................... P2000-308313

(51) Int. Cl.$^7$ ............................. C01B 25/00; H01M 6/00
(52) U.S. Cl. ...................... 29/623.1; 423/306; 423/277; 429/224; 429/231.5; 429/220; 429/223; 429/229; 429/231.95; 429/231.6; 429/231.8; 429/221
(58) Field of Search ................................ 423/306, 277; 29/623.1; 264/603, 681; 429/224, 231.5, 220, 223, 231.2, 231.3, 229, 231.95, 231.6, 231.8, 221; 241/22, 23

(56) References Cited

U.S. PATENT DOCUMENTS 6,528,033 B1 * 3/2003 Barker et al. ............... 423/306

FOREIGN PATENT DOCUMENTS

JP 9134725 5/1997
WO 9812761 3/1998

* cited by examiner

*Primary Examiner*—Steven Bos
(74) *Attorney, Agent, or Firm*—Sonnenschein, Nath & Rosenthal LLP

(57) ABSTRACT

A method for producing a cathode active material having superior cell characteristics through single-phase synthesis of a composite material composed of a compound represented by the general formula $Li_xFe_{1-y}M_yPO_4$ and a carbon material positively and a method for producing a non-aqueous electrolyte cell employing the so produced cathode active material. To this end, the cathode active material is prepared by a step of mixing the starting materials for synthesis of the compound represented by the general formula $Li_xFe_{1-y}M_yPO_4$, a step of milling a mixture obtained by the mixing step, a step of compressing the mixture obtained by the mixing step to a preset density and a step of sintering the mixture obtained by the compressing step. A carbon material is added in any one of the above steps prior to the sintering step. The density of the mixture in the compressing step is set to not less than 1.71 g/cm$^3$ and not larger than 2.45 g/cm$^3$.

10 Claims, 5 Drawing Sheets

METHOD FOR PRODUCING CATHODE ACTIVE MATERIAL AND METHOD FOR PRODUCING NON-AQUEOUS ELECTROLYTE CELL

RELATED APPLICATION DATA

The present application claims priority to Japanese Application(s) No(s). P2000-308300 filed Oct. 6, 2000, and P2000-308313 filed Oct. 6, 2000, which application(s) is/are incorporated herein by reference to the extent permitted by law.

BACKGROUND OF THE INVENTION

1. Field of the Invention

This invention relates to a cathode active material capable of reversibly doping/dedoping lithium and to a non-aqueous electrolyte cell employing this cathode active material.

2. Description of Related Art

Recently, with drastic progress in the art of electronic equipment, investigations into a rechargeable secondary cell, as a power source that may be used conveniently and economically for prolonged time, are proceeding briskly. Among typical secondary cells, there are a lead storage cell, an alkali storage cell and a non-aqueous electrolyte secondary cell.

Among the aforementioned secondary cells, a lithium ion secondary cell, as a non-aqueous electrolyte secondary cell, has advantages such as high output or high energy density.

A lithium ion secondary cell is made up of a cathode and an anode, each having an active material capable of reversibly doping/dedoping at least lithium ions, and a non-aqueous electrolyte. The charging reaction of the lithium ion secondary cell proceeds as lithium ions are deintercalated into an electrolyte solution at the cathode and are intercalated into the anode active material. In discharging, reaction opposite to that of the charging reaction proceeds, such that lithium ions are intercalated at the cathode. That is, charging/discharging is repeated as the reaction of entrance/exit of lithium ions from the cathode into and from the anode active material occurs repeatedly.

As the cathode active material of the lithium ion secondary cell, $LiCoO_2$, $LiNiO_2$ or $LiMn_2O_4$ is used because these materials have a high energy density and a high voltage. However, these cathode active materials, containing metal elements of low Clark number in their composition, suffer from high cost and supply instability. Moreover, these cathode active materials are higher in toxicity and affect the environment significantly. So, there is presented a demand for a novel substitution material usable as a cathode active material.

Proposals have been made for use of $LiFePO_4$ having an olivinic structure, as a cathode active material for a lithium ion secondary cell. $LiFePO_4$ has a volumetric density as high as 3.6 g/m$^3$ and generates a high potential of 3.4V, with its theoretical capacity also being as high as 170 mAh/g. Additionally, $LiFePO_4$ contains an electrochemically dedopable Li at a rate of one atom per Fe atom, in its initial state, and therefore is promising as a cathode active material for a lithium ion secondary cell. Moreover, $LiFePO_4$ includes iron, as an inexpensive material plentiful in supply, in its composition, and therefore is less costly than any of the aforementioned materials, that is $LiCoO_2$, $LiNiO_2$ or $LiMn_2O_4$.

However, since $LiFePO_4$ has only low electronic conductivity, the internal resistance of the cell may occasionally be increased if $LiFePO_4$ is used as a cathode active material. If the internal resistance of the cell is increased, the polarization potential on cell circuit closure is increased to decrease the cell capacity. Additionally, since the true density of $LiFePO_4$ is lower than that of the conventional cathode material, the active material charging ratio cannot be increased if $LiFePO_4$ is used as the cathode active material, such that the call cannot be increased sufficiently in energy density.

So, a proposal has been made of employing, as a cathode active material, a composite material of a compound represented by the general formula $Li_xFePO_4$, where $0<x\leq1$, having an olivinic structure, and a carbon material for its superiority in electronic conductivity. This composite material is referred to below as an $LiFePO_4$ composite material.

Meanwhile, if an impurity is left over in the $Li_xFePO_4$ carbon composite material, as a cathode active material, the cell characteristics are lowered, because the impurity fails to contribute to the cell reaction. For improving the cell characteristics, it is necessary to prepare the $Li_xFePO_4$ carbon composite material not containing residual impurity, that is to synthesize the $Li_xFePO_4$ carbon composite material in a single phase.

For preparing the $Li_xFePO_4$ carbon composite material, such a method has been proposed which consists in mixing starting materials for synthesis of $Li_xFePO_4$, milling the resulting mixture, sintering the milled product and adding a carbon material at an optional time point to the starting materials for synthesis.

It is however difficult to realize a smooth reaction for synthesis in the sintering process, such that there lacks at present a technique of synthesizing the $Li_xFePO_4$ carbon composite material in a single phase and therefore a non-aqueous electrolyte cell employing the $Li_xFePO_4$ carbon composite material synthesized in a single phase has not been realized.

SUMMARY OF THE INVENTION

It is therefore an object of the present invention to provide a method for the preparation of a cathode active material having a superior cell capacity through reliable single-phase synthesis of a compound represented by the general formula $Li_xFe_{1-y}M_yPO_4$ and a carbon material and a method for the preparation of a non-aqueous electrolyte cell having a high cell capacity.

In one aspect, the present invention provided a method for preparing a cathode active material including a mixing step of mixing starting materials for synthesis of a compound represented by a general formula $Li_xFe_{1-y}M_yPO_4$, where M is at least one selected from the group consisting of Mn, Cr, Co, Cu, Ni, V, Mo, Ti, Zn, Al, Ga, Mg, B and Nb, with $0.05\leq x\leq1.2$ and $0\leq y\leq0.8$, a milling step of milling a mixture obtained in the mixing step, a compressing step of compressing the milled mixture obtained in the milling step to a preset density and a sintering step of sintering the mixture compressed in the compressing step. A carbon material is added in any of the above steps previous to the sintering step and the density of the mixture is set in the compressing step to not less than 1.71 g/cm$^3$ and not larger than 2.45 g/cm$^3$.

In the method for preparing the cathode active material, described above, there is provided the compressing step between the milling and sintering steps of compressing the milled mixture, that is the milled starting materials for synthesis of the cathode active material, to a preset density, that is to not less than 1.71 g/cm$^3$ and not larger than 2.45 g/cm³. This diminishes the gap between the particles of the mixture, that is the starting materials for synthesis of the cathode active material, charged into the sintering step, thereby assuring a sufficient area of contact of the particles of the starting materials for synthesis. By carrying out the sintering step as a sufficient contact area is maintained between the starting materials for synthesis, the synthesis reaction is improved in reaction efficiency to realize single-phase synthesis of the cathode active material, that is the composite material composed of $Li_xFe_{1-y}M_yPO_4$ and carbon. So, with the manufacturing method for the cathode active material, it is possible to produce a cathode active material which may assure a high cell capacity.

That is, with the method for preparing the cathode active material, according to the present invention, there is provided, between the milling step and the sintering step, a step of compressing the milled mixture, that is milled starting materials for synthesis of the cathode active material, to a preset density, that is to not less than 1.71 g/cm³ and not larger than 2.45 g/cm³, thus realizing single-phase synthesis of the cathode active material, that is $LiFePO_4$ carbon composite material.

So, with the present manufacturing method for the cathode active material, there may be provided a manufacturing method for the cathode active material for a cell having a high cell capacity through single-phase synthesis of the cathode active material.

In another aspect, the present invention provides a method for the preparing a non-aqueous electrolyte cell having a cathode including a cathode active material, an anode including an anode active material and a non-aqueous electrolyte, wherein the cathode active material is produced by a mixing step of mixing starting materials for synthesis of a compound represented by the general formula $Li_xFe_{1-y}M_yPO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, a milling step of milling a mixture obtained in the mixing step, a compressing step of compressing the milled mixture to a preset density and a sintering step of sintering the mixture compressed in the compressing step, a carbon material being added in any of the above steps previous to the sintering step. The density of the mixture is set in the compressing step to not less than 1.71 g/cm³ and not larger than 2.45 g/cm³.

In the method for producing the non-aqueous electrolyte cell, described above, there is provided, in producing the cathode active material, the compressing step between the milling and sintering steps of compressing the milled mixture, that is the milled starting materials for synthesis of the cathode active material, to a preset density, that is to not less than 1.71 g/cm³ and not larger than 2.45 g/cm³. This diminishes the gap between the particles of the mixture, that is the starting materials for synthesis of the cathode active material, charged into the sintering step, thereby assuring a sufficient area of contact of the particles of the starting materials for synthesis. By carrying out the sintering step as a sufficient contact area is maintained between the starting materials for synthesis, the synthesis reaction is improved in reaction efficiency to realize single-phase synthesis of the cathode active material, that is the composite material composed of $Li_xFe_{1-y}M_yPO_4$ and carbon. So, with the manufacturing method for the non-aqueous electrolyte cell, it is possible to produce a non-aqueous electrolyte cell having a high cell capacity.

That is, with the manufacturing method for the non-aqueous electrolyte cell, according to the present invention, there is provided, between the milling step and the sintering step, a step of compressing the milled mixture, that is milled starting materials for synthesis of the cathode active material, to a preset density, that is to not less than 1.71 g/cm³ and not larger than 2.45 g/cm³, thus realizing single-phase synthesis of the cathode active material, that is $LiFePO_4$ carbon composite material.

So, with the present manufacturing method for the non-aqueous electrolyte cell, there may be provided a manufacturing method for the cathode active material for a cell having a high cell capacity through single-phase synthesis of the cathode active material.

In still another aspect, the present invention provides a method for preparing a cathode active material including a mixing step of mixing starting materials for synthesis of a compound represented by the general formula $Li_xFe_{1-y}M_yPO_4$, where $0.05 \leq x \leq 1.2$, $0 \leq y \leq 0.8$, and M is at least one selected from the group consisting of Mn, Cr, Co, Cu, Ni, V, Mo, Ti, Zn, Al, Ga, Mg, B and Nb, a milling step of milling a mixture obtained in the mixing step, and a sintering step of sintering the mixture milled in the milling step. A carbon material is added in any of the above steps and, following the milling step, the tap density of the starting materials for synthesis is set to not less than 0.4 g/cc and not larger than 2.0 g/cc.

In the method for preparing the cathode active material according to the present invention, in which the tap density of the starting materials for synthesis following the milling step is prescribed as described above, the starting materials for synthesis are comminuted sufficiently thus assuring a sufficient contact area of the particles of the starting materials for synthesis during the sintering step. Thus, with the present manufacturing method for the cathode active material, the synthesis reaction in the sintering step is improved in reaction efficiency, thereby yielding a composite material of $Li_xFe_{1-y}M_yPO_4$ and the carbon material, that is a cathode active material not containing impurities. It should be noted that the milling means comminution and mixing performed concurrently.

In yet another aspect, the present invention provides a method for preparing a non-aqueous electrolyte cell having a cathode including a cathode active material, an anode including an anode active material and a non-aqueous electrolyte, wherein, for producing the cathode active material, a mixing step of mixing staring materials for synthesis of a compound represented by the general formula $Li_xFe_{1-y}M_yPO_4$, where $0.05 \leq x \leq 1.2$, $0 \leq y \leq 0.8$, and M is at least one selected from the group consisting of Mn, Cr, Co, Cu, Ni, V, Mo, Ti, Zn, Al, Ga, Mg, B and Nb, a milling step of milling a mixture obtained in the mixing step, and a sintering step of sintering the mixture milled in the milling step, are carried out. A carbon material is added in any of the above steps and, following the milling step, the tap density of the starting materials for synthesis is set to not less than 0.4 g/cc and not larger than 2.0 g/cc.

In the manufacturing method for the non-aqueous electrolyte cell according to the present invention, a composite material of $Li_xFe_{1-y}M_yPO_4$ and the carbon material can be synthesized reliably in a single step, thus yielding a non-aqueous electrolyte cell having superior cell characteristics, such as cell capacity or cyclic characteristics.

The method for preparing the cathode active material of the present invention comprises a mixing step of mixing starting materials for synthesis of a compound represented by the general formula $Li_xFe_{1-y}M_yPO_4$, where $0.05 \leq x \leq 1.2$, $0 \leq y \leq 0.8$, and M is at least one selected from the group consisting of Mn, Cr, Co, Cu, Ni, V, Mo, Ti, Zn, Al, Ga, Mg, B and Nb, a milling step of milling a mixture obtained in the mixing step, and a sintering step of sintering the mixture milled in the milling step. Moreover, a carbon material is added in any of the above steps while the tap density of the starting materials for synthesis is set to not less than 0.4 g/cc and not larger than 2.0 g/cc after the milling step. Thus, the starting materials can be commuted sufficiently, so that the sufficient contact area in which starting material contacts with each other can be assured. That is, according to the method for the cathode active material, a smooth reaction for synthesis in the sintering step can be achieved, and the $Li_xFe_{1-y}M_yPO_4$ carbon composite material can be synthesized in a single phase. This enable the cathode active material having superior cell characteristics, and free of impurities.

Also, according to the method for preparing non-aqueous electrolyte cell, the non-aqueous electrolyte cell is produced with the use of so-produced cathode active material. This enable the non-aqueous electrolyte cell which is superior in its cell characteristics, such as cell capacity or cyclic characteristics.

DESCRIPTION OF THE PREFERRED EMBODIMENTS

Figure 1:
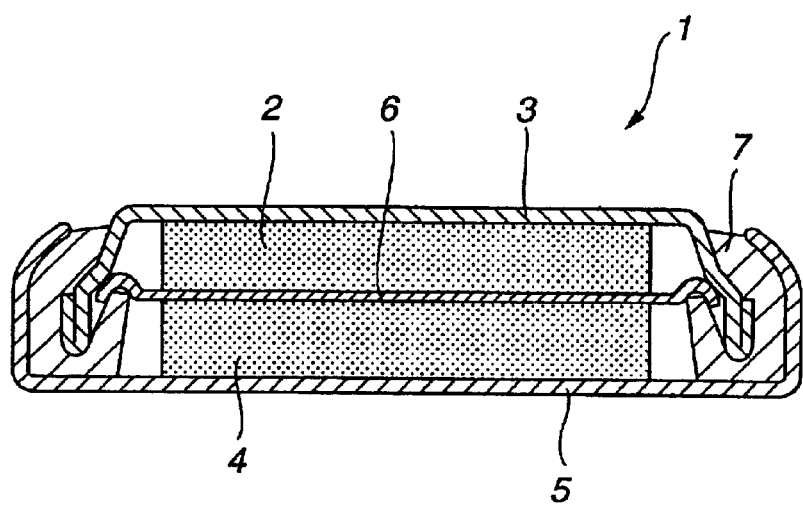
FIG. 1 is a longitudinal cross-sectional view showing an illustrative structure of a non-aqueous electrolyte secondary cell employing the present invention.

Referring to the drawings, preferred embodiments of the present invention will be explained in detail. The present invention is not to be limited to the embodiments, as now explained, but may be suitably modified without departing from its scope.

Referring to FIG. 1, a non-aqueous electrolyte cell 1, prepared in accordance with the present invention, includes an anode 2, an anode can 3 for holding the anode 2, a cathode 4, a cathode can 5 for holding the cathode 4, a separator 6 arranged between the cathode 4 and the anode 2, and an insulating gasket 7. A non-aqueous electrolyte solution is charged into the anode can 3 and into the cathode can 5.

The anode 2 is formed by e.g., a metal lithium foil, acting as anode active material. If a material capable of doping/dedoping lithium is used as anode active material, a layer of the anode active material, containing the anode active material, is formed on an anode current collector of the anode 2. The anode current collector may, for example, be a nickel foil.

As the anode active material, capable of doping/dedoping lithium, metal lithium, lithium alloys, a lithium-doped electrically conductive high molecular material, or a layered compound, such as carbon material or metal oxide, may be used.

As a binder contained in the layer of the anode active material, any suitable known resin material, routinely used as a binder for the layer of the anode active material in this sort of the non-aqueous electrolyte cell, may be used.

The anode can 3 holds the anode 2 and serves as an external anode for the non-aqueous electrolyte cell 1.

The cathode 4 is a layer of a cathode active material containing a cathode active material operates in a reversible fashion for electrochemically emitting lithium on a cathode current collector formed e.g., by an aluminum foil, and also occluding lithium. The layer of the cathode active material is mainly composed of a cathode active material and may contain a binder and an electrically conductive material as necessary.

The cathode active material used is a composite material of a compound of an olivinic structure represented by the general formula $Li_xFe_{1-y}M_yPO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, that is an $Li_xFe_{1-y}M_yPO_4$ carbon composite material.

Such a case in which $LiFePO_4$ is used as $Li_xFe_{1-y}M_yPO_4$ and a composite material composed of this $LiFePO_4$ and a carbon material, that is $LiFePO_4$ carbon composite material, is used as a cathode active material, is hereinafter explained.

The $LiFePO_4$ carbon composite material is comprised of $LiFePO_4$ grains, on the surfaces of which are attached numerous grains of a carbon material drastically smaller in grain size than the $LiFePO_4$ grains. Since the carbon material is electrically conductive, the $LiFePO_4$ carbon composite material is superior in electronic conductivity to e.g., $LiFePO_4$. That is, the $LiFePO_4$ carbon composite material is improved in electronic conductivity due to carbon grains attached to the surface of $LiFePO_4$ grains, so that the capacity proper to $LiFePO_4$ can be exploited sufficiently. Thus, by employing the $LiFePO_4$ carbon composite material as the cathode active material, the non-aqueous electrolyte cell 1 having a high capacity can be achieved.

The carbon content per unit weight of the $LiFePO_4$ carbon composite material is preferably not less than 3 wt %. If the carbon content per unit weight of the $LiFePO_4$ carbon composite material is less than 3 wt %, the amount of carbon grains attached to the surfaces of the $LiFePO_4$ grains is not enough such that there is a risk of failure in achieving a sufficient effect in improving electronic conductivity.

As the carbon material forming the $LiFePO_4$ carbon composite material, such a material where the strength to area ratio A(D/G) of diffraction lines appearing at 1570 to 1590 $cm^{-1}$ to those appearing at 1340 to 1360 $cm^{-1}$ of the number of waves in the Raman spectrum of graphite Gr in the Raman spectrometry not less than 0.3, is preferably used.

Figure 2:
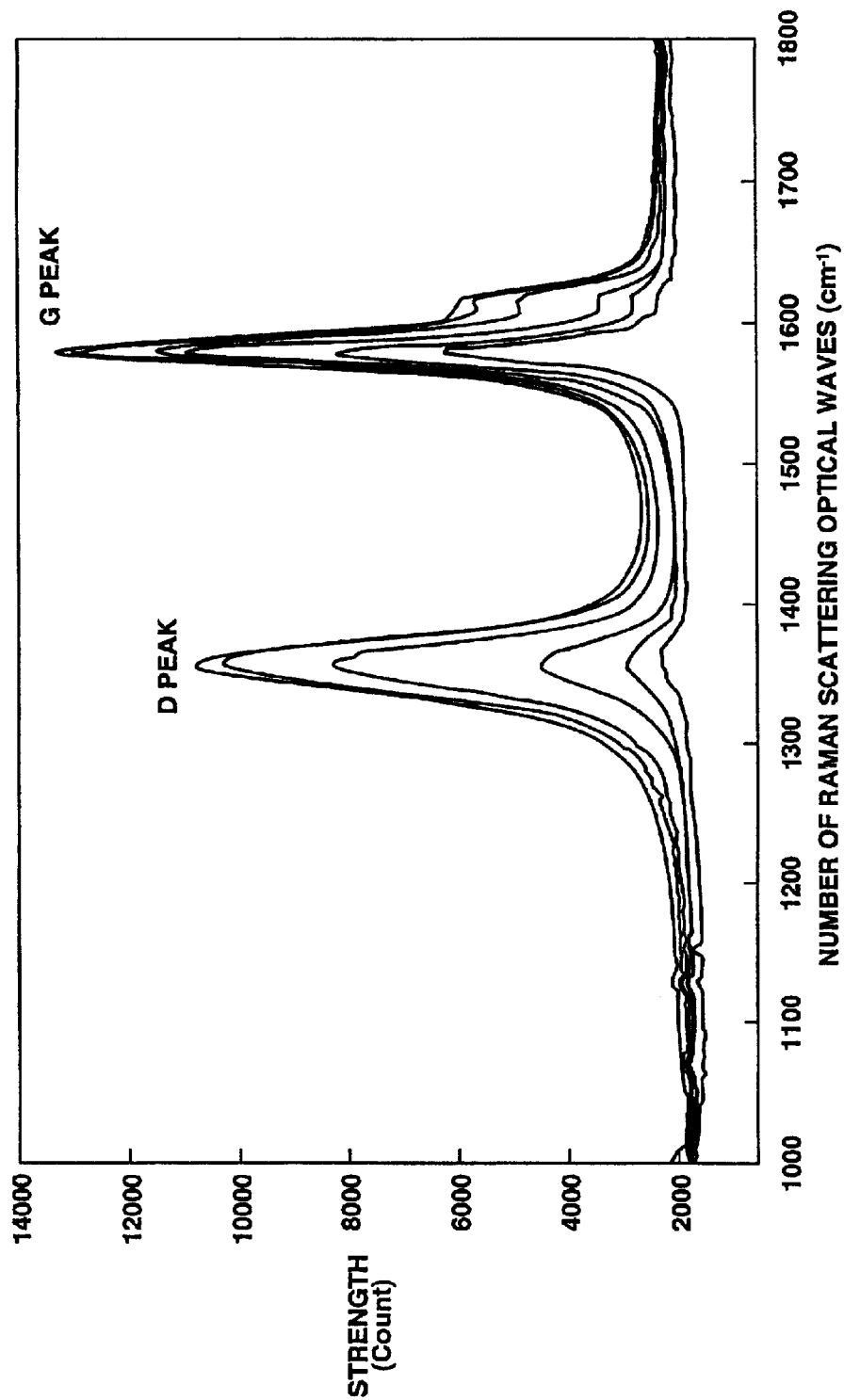
FIG. 2 is a graph showing the characteristics of a Raman spectral peak of a carbon material.
Figure 3:
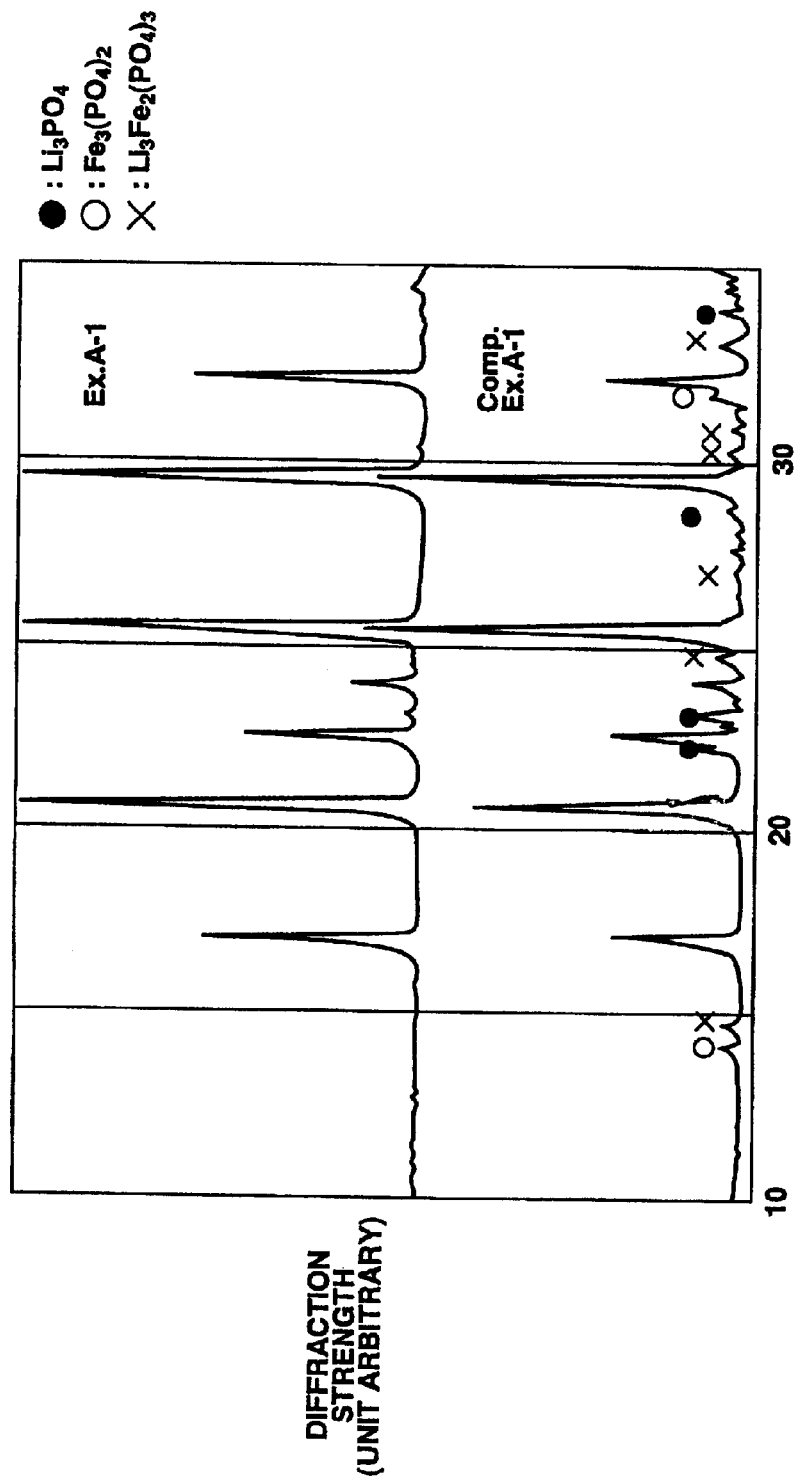
FIG. 3 is a graph showing the results of X-ray diffractometry of a cathode active material.

The strength to area ratio A(D/G) is defined herein to be the background-free Raman spectrum strength area ratio A(D/G) of the D peak appearing at the number of waves of 1340 to 1360 $cm^{-1}$ to the G peak appearing at the number of waves of 1570 to 1590 $cm^{-1}$ as measured by Raman spectrometry as shown in FIG. 2. The 'background-free ' is synonymous with freeness from a noisy portion.

Among numerous peaks of the Raman spectrum of Gr, two peaks, namely the G peak appearing at the number of waves of 1570 to 1590 $cm^{-1}$ and the D peak appearing at the number of waves of 1340 to 1360 $cm^{-1}$, are observed, as described above. Of these, the D peak is inherently not derived from the G peak, but is a Raman-inactive peak appearing when the structure is distorted and structural symmetry becomes lower. Thus, it is known that the D peak is a measure of structural distortion, and that the strength area ratio A(D/G) of the D and G peaks is correlated linearly with a reciprocal of the crystallite size La along the a-axis of Gr.

As such carbon material, an amorphous carbon material, such as acetylene black, may preferably be used.

The carbon material having the strength to area ratio A(D/G) of not less than 0.3 may be obtained e.g., by processing such as comminution with a pulverizer. A carbon material having an optional A (D/G) may be obtained extremely readily by controlling the comminuting time.

For example, graphite, as a crystalline carbon material, may have its structure destructed extremely readily by comminution with a powerful pulverizer, such as a planetary ball mill, and is amorphized progressively resulting in an increased strength to area ratio A (D/G). That is, by controlling the driving time of the pulverizer, such a carbon material having an optional A (D/G) not less than 0.3 may be produced extremely readily. Thus, on comminution, crystalline carbon materials also may be preferably used.

The powder density of the $LiFePO_4$ carbon composite material is preferably not less than 2.2 g/cm$^3$. If the starting materials for synthesis are milled to such an extent that the powder density of the $LiFePO_4$ carbon composite material is not less than 2.2 g/cm$^3$, the composite material is comminuted sufficiently. Consequently, the cathode active material is improved in charging density, with the result that the non-aqueous electrolyte cell 1 having a high capacity may be achieved. On the other hand, since the $LiFePO_4$ carbon composite material is comminuted to satisfy the above-mentioned powder density, the specific surface area of $LiFePO_4$ also may be said to be increased. That is, a sufficient contact area between $LiFePO_4$ and the carbon material may be assured to enable the electronic conductivity to be improved.

If the powder density of the $LiFePO_4$ carbon composite material is less than 2.2 g/cm$^3$, the $LiFePO_4$ carbon composite material is not compressed sufficiently, so that the active material charging ratio at the cathode 4 may not be improved.

The Brunauer-Emmet-Teller (BET) specific surface area of the $LiFePO_4$ carbon composite material is preferably not less than 10.3 m$^2$/g. If the BET specific surface area of $LiFePO_4$ carbon composite material is not less than 10.3 m$^2$/g, the specific surface area of $LiFePO_4$ per unit area can be sufficiently large to increase the contact area of $LiFePO_4$ with the carbon material. The result is the improved electronic conductivity of the cathode active material.

Additionally, the primary grain size of the $LiFePO_4$ carbon composite material is desirably not larger than 3.1 μm. With the primary grain size of the $LiFePO_4$ carbon composite material of not larger than 3.1 μm, the specific surface area of $LiFePO_4$ per unit area can be sufficiently large to increase the contact area of $LiFePO_4$ with the carbon material. The result is again the improved electronic conductivity of the cathode active material.

As a binder contained in the layer of the cathode active material, any suitable known resin material, routinely used as a binder of the layer of the cathode active material in this sort of the non-aqueous electrolyte cell, may be used.

The cathode can 5 holds the cathode 4 and also serves as exterior cathode of the non-aqueous electrolyte cell 1.

The separator 6, used for separating the cathode 4 from the anode 2, may be formed of any suitable material routinely used as this sort of the non-aqueous electrolyte cell, and may, for example, be a film of a high molecular material, such as polypropylene. From the relation between lithium ion conductivity and the energy density, the thickness of the separator needs to be as thin as practicable. Specifically, the thickness of the separator of, for example, 50 μm, may be preferred.

The insulating gasket 7 is built as one into the anode can 3. The role of the insulating gasket 7 is to prevent leakage of the charged non-aqueous electrolyte solution from the anode can 3 and the cathode can 5.

The non-aqueous electrolyte may be a solution of an electrolyte in a non-protonic non-aqueous solvent.

As the non-aqueous solvent, use may be made of, for example, propylene carbonate, ethylene carbonate, butylene carbonate, vinylene carbonate, γ-butyl lactone, sulfolane, 1,2-dimethoxyethane, 1,2-diethoxyethane, 2-methyl tetrahydrofuran, 3-methyl-1,3-dioxolane, methyl propionate, methyl butyrate, dimethyl carbonate, diethyl carbonate, or dipropyl carbonate, etc. In particular, from the perspective of voltage stability, cyclic carbonates, such as propylene carbonate, ethylene carbonate, butylene carbonate or vinylene carbonate, and chained carbonates, such as dimethyl carbonate, diethyl carbonate or dipropyl carbonate, may preferably be used. These non-aqueous solvents may be used either singly or in combination.

The electrolytes dissolved in the non-aqueous solvent may be lithium salts, such as $LiPF_6$, $LiClO_4$, $LiAsF_6$, $LiBF_4$, $LiCF_3SO_3$ and $LiN(CF_3SO_2)_2$. Of these lithium salts $LiPF_6$ or $LiBF_4$, in particular, are preferably employed.

As the non-aqueous electrolyte cell of the present invention, the non-aqueous electrolyte cell 1 employing the non-aqueous electrolyte is taken as an example in the foregoing embodiment. However, the present invention is not to be limited to this embodiment, and may be suitably applied to such a case employing a solid electrolyte. As the solid electrolyte, any material having lithium ion conductivity property can be used, such as an inorganic solid electrolyte or a high molecular solid electrolyte, such as gelated electrolyte. The inorganic solid electrolyte maybe lithium nitride or lithiumiodide. The high molecular solid electrolyte is composed of an electrolyte salt and a high molecular compound dissolving it. As the high molecular compound, ether based high molecular material, such as poly(ethylene oxide) or an cross-linked product thereof, a poly(methacrylate) ester based high molecular material or an acrylate-based high molecular material, may be used either singly or as a copolymer or as a mixture in the molecules. In this case, as a matrix of the gelated electrolyte, any of a variety of high molecular materials that may be gelated on absorption of the non-aqueous electrolyte solution, may be used. These high molecular materials may be exemplified by fluorine based high molecular materials, such as poly (vinylidene fluoride), poly (vinylidene fluoride-CO-hexafluoropropylene), ether based high molecular materials, such as poly (ethylene oxide) or cross-linked products thereof, and poly(acrylonitrile). Of these, the fluorine based high molecular materials are particularly desirable from the perspective of redox stability.

The manufacturing method for the above-described non-aqueous electrolyte cell 1 is hereinafter explained.

First, a composite material of $Li_xFePO_4$ and a carbon material, as the cathode active material, is synthesized by a manufacturing method, indicated below.

For synthesizing the cathode active material, $Li_xFePO_4$ as a starting material for synthesis is kneaded together, milled and sintered. At an optional time point in the course of the mixing, milling and sintering, a carbon material is added to the kneaded starting materials for synthesis. As the $Li_xFePO_4$ starting materials for synthesis, $Li_3PO_4 \cdot i_3(PO_4)_2$ or a hydrate $Fe_3(PO_4)_2 \cdot nH_2O$ thereof where n denotes the number of hydrates, are used.

In the following, such a case is explained in which lithium phosphate $Li_3PO_4$ and $Fe_3(PO_4)_2 \cdot 8H_2O$, synthesized as explained below, are used as starting materials for synthesis, and in which, after adding a carbon material to these starting materials for synthesis, a number of process steps are executed to synthesize the $LiFePO_4$ carbon composite material.

First, the $LiFePO_4$ starting materials for synthesis and the carbon material are mixed together to form a mixture by way of a mixing step. The mixture from the mixing step is then milled by a milling process, and the milled mixture then is fired by way of a sintering process.

In the mixing process, lithium phosphate and ferrous phosphate octahydrate are mixed together at a pre-set ratio and further added to with a carbon material to form a mixture.

This ferrous phosphate octahydrate, used as a starting material for synthesis, is synthesized by adding disodium hydrogen phosphate dodecahydrate ($2Na_2HPO_4 \cdot 12H_2O$) to an aqueous solution obtained on dissolving ferrous sulfide heptahydrate ($FeSO_4 \cdot 7H_2O$) in water and by allowing the resulting mass to dwell for a pre-set time. The reaction of synthesis of ferrous phosphate octahydrate may be represented by the following chemical formula (1):

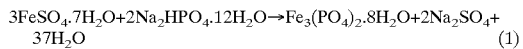

$$3FeSO_4 \cdot 7H_2O + 2Na_2HPO_4 \cdot 12H_2O \rightarrow Fe_3(PO_4)_2 \cdot 8H_2O + 2Na_2SO_4 + 37H_2O \quad (1)$$

In ferrous phosphate octahydrate, as the material for synthesis, there is contained a certain amount of $Fe^{3+}$, resulting from the synthesis process. If $Fe^{3+}$ is left in the material for synthesis, a trivalent Fe compound is generated by sintering to obstruct single-phase synthesis of the $LiFePO_4$ carbon composite material. It is therefore necessary to add a reducing agent to the starting materials for synthesis prior to sintering and to reduce $Fe^{3+}$ contained in the starting materials for synthesis at the time of firing to $Fe^{2+}$.

However, there is a limitation to the capability of the reducing agent in reducing $Fe^{3+}$ to $Fe^{2+}$ by the reducing agent, such that, if the content of $Fe^{3+}$ in the starting materials for synthesis is excessive, it may be an occurrence that $Fe^{3+}$ is not reduced in its entirety but is left in the $LiFePO_4$ carbon composite material.

It is therefore desirable that the content of $Fe^{3+}$ in the total iron in the ferrous phosphate octahydrate be set to 61 wt % or less. By limiting the content of $Fe^{3+}$ in the total iron in the ferrous phosphate octahydrate to 61 wt % or less, from the outset, single-phase synthesis of the $LiFePO_4$ carbon composite material can be satisfactorily achieved without allowing $Fe^{3+}$ to be left at the time of firing, that is without generating impurities ascribable to $Fe^{3+}$.

It should be noted that, the longer the dwell time in generating ferrous phosphate octahydrate, the larger becomes the content of $Fe^{3+}$ in the generated product, so that, by controlling the dwell time so as to be equal to a preset time, ferrous phosphate octahydrate having an optional $Fe^{3+}$ content can be produced. The content of $Fe^{3+}$ in the total iron in the ferrous phosphate octahydrate can be measured by the Mössbauer method.

The carbon material added to the starting materials for synthesis acts as a reducing agent for reducing $Fe^{3+}$ to $Fe^{2+}$, at the time of sintering, even if $Fe^{2+}$ contained in ferrous phosphate octahydrate as the starting materials for synthesis is oxidized to $Fe^{3+}$ by oxygen in atmosphere or due to sintering. Therefore, even if $Fe^{3+}$ is left in the starting materials for synthesis, impurities may be prevented from being generated to assure single-phase synthesis of the $LiFePO_4$ carbon composite material. Moreover, the carbon material acts as an antioxidant for preventing oxidation of $Fe^{2+}$ contained in the starting materials for synthesis to $Fe^{3+}$. That is, the carbon material prevents oxidation to $Fe^{3+}$ of $Fe^{2+}$ by oxygen present in atmosphere and in a firing oven prior to or during sintering.

That is, the carbon material acts not only as an electrification agent for improving the electronic conductivity of the cathode active material but also as a reducing agent and as an antioxidant. Meanwhile, since this carbon material is a component of the $LiFePO_4$ carbon composite material, there is no necessity of removing the carbon material following synthesis of the $LiFePO_4$ carbon composite material. The result is the improved efficiency in the preparation of the $LiFePO_4$ carbon composite material.

It is noted that the carbon content per unit weight of the $LiFePO_4$ carbon composite material be not less than 3 wt %. By setting the carbon content per unit weight of the $LiFePO_4$ carbon composite material to not less than 3 wt %, it is possible to utilize the capacity and cyclic characteristics inherent in $LiFePO_4$ to its fullest extent.

In the milling process, the mixture resulting from the mixing process is subjected to milling in which pulverization and mixing are carried out simultaneously. By the milling herein is meant the powerful comminuting and mixing by a ball mill. As the ball mill, any suitable known ball mill, such as a beads mill or an attriter, is used.

By milling the mixture from the mixing process, the starting materials for synthesis and the carbon material can be mixed homogeneously. Moreover, if the starting materials for synthesis is comminuted by milling, the specific surface area of the starting materials for synthesis can be increased, thereby increasing the contact points of the starting materials for synthesis to accelerate the synthesis reaction in the subsequent sintering process.

According to the present invention, the mixture containing the starting materials for synthesis is milled to set the tap density of the starting materials for synthesis to not less than 0.4 g/cc and not larger than 2.0 g/cc. In particular, the tap density of the starting materials for synthesis following the milling step is desirably not less than 0.6 g/cc and not larger than 2.0 g/cc. With the tap density of the starting materials for synthesis following the milling step as described above, the starting materials for synthesis are sufficiently comminuted to assure a sufficient contact area of the starting materials for synthesis in the sintering step. Thus, with the present manufacturing method of the cathode active material, the reaction efficiency of the synthesizing reaction in the sintering step is satisfactory to assure reliable single-phase synthesis of the $LiFePO_4$ carbon composite material, with the result that the non-aqueous electrolyte cell 1 having a high capacity and superior recycling characteristics may be achieved.

If the milling gives starting materials for synthesis having a tap density less than 0.4 g/cc, the starting materials for synthesis are not comminuted sufficiently and are of only limited specific surface area. The result is only insufficient contact area between the starting materials for synthesis so that the reaction efficiency of the synthesis reaction in the next following sintering step is lowered. Moreover, if the milling yields the starting materials for synthesis having the tap density exceeding 2.0 g/cc, the synthesis reaction in the next following sintering step proceeds excessively to cause growth of crystal grain size excessively. Since this diminishes the specific surface area of $LiFePO_4$ and the contact area thereof with the carbon material, the cathode active material produced is inferior in electronic conductivity.

It is desirable that, by milling the mixture containing the starting materials for synthesis, the particle size distribution of the particle size not less than 3 μm be not larger than 22% in terms of the volumetric integration frequency. With the particle size distribution of the starting materials for synthesis in the above range, the starting materials for synthesis has a surface area sufficient to produce surface activity for carrying out the synthesis reaction. Thus, even if the sintering temperature is of a low value of e.g., 600° C. which is lower than the melting point of the starting materials for synthesis, the reaction efficiency is optimum, thus realizing the single-phase synthesis of the $LiFePO_4$ carbon composite material satisfactorily.

Moreover, the milling is desirably executed so that the powder density of the $LiFePO_4$ carbon composite material will be 2.2 g/cm$^3$ or higher. By comminuting the starting materials for synthesis to yield the above defined powder density, the specific surface area of $LiFePO_4$ and thus the contact area between $LiFePO_4$ and the carbon material can be increased to improve the electronic conductivity of the cathode active material.

Thus, by milling the mixture containing the starting materials for synthesis, such a cathode active material may be produced which is able to realize a high capacity non-aqueous electrolyte cell 1.

In the compression step, the milled mixture is pressed for compaction so that the density of the as-compressed mixture, referred to below as press density, will be not less than 1.71 g/cm$^3$ and not larger than 2.45 g/cm$^3$. By setting the press density of the mixture to not less than 1.71 g/cm$^3$ and not larger than 2.45 g/cm$^3$, it is possible to diminish the gap between the starting materials for synthesis to provide a sufficient contact area between the starting materials for synthesis. By carrying out sintering as a sufficient contact area is kept between the starting materials for synthesis, the synthesis reaction can be improved in reaction efficiency to provide for reliable single-phase synthesis of the $LiFePO_4$ carbon composite material. If the press density is less than 1.71 g/cm$^3$, sufficient contact area cannot be kept between the starting materials for synthesis such that optimum reaction efficiency cannot be realized in the synthesis reaction in the sintering step. Moreover, if the press density is higher than 2.45 g/cm$^3$, the synthesis reaction in the next following sintering step proceeds excessively to cause growth of crystal grain size excessively. The result is that the specific surface area of the $LiFePO_4$ carbon composite material is diminished to reduce the contact area thereof with the electrically conductive material or the contact area between the cathode active materials, thus lowering the electronic conductivity of the cathode active material.

The present manufacturing method for the cathode active material therefore includes a compression step of pressing the milled mixture, that is the starting materials for synthesis of the cathode active material, to a preset density, that is to a density not less than 1.71 g/cm$^3$ and not larger than 2.45 g/cm$^3$, it is possible to effect optimum single-phase synthesis of the cathode active material, that is the $LiFePO_4$ carbon composite material.

There is no particular limitation to means for pressing the milled mixture for compaction, and hence any suitable known means may be used.

In the sintering step, the mixture obtained on compaction in the compression step is sintered. By sintering the mixture, lithium phosphate may be reacted with ferrous phosphate octahydrate to synthesize $LiFePO_4$.

The synthesis reaction of $LiFePO_4$ may be represented by the following reaction formula (2):

$$Li_3PO_4 + Fe_3(PO_4)_2 \cdot nH_2O \rightarrow 3LiFePO_4 + nH_2O \quad (2)$$

where n denotes the number of hydrates and is equal to 0 for an anhydride. In the chemical formula (2), $Li_3PO_4$ is reacted with $Fe_3(PO_4)_2$ or its hydrate $Fe_3(PO_4)_2 \cdot nH_2O$ where n denotes the number of hydrates.

As may be seen from the chemical formula, no by-product is yielded if $Fe_3(PO_4)_2$ is used as a starting materials for synthesis. On the other hand, if $Fe_3(PO_4)_2 \cdot nH_2O$ is used, water, which is non-toxic, is by-produced.

Conventionally, lithium carbonate, ammonium dihydrogen phosphate and ferrous acetate II, as syntheses materials, are mixed at a pre-set ratio and sintered to synthesize $LiFePO_4$ by the reaction shown by the following chemical formula (3):

$$Li_2CO_3 + 2Fe(CH_3COO)_2 + 2NH_4H_2PO_4 \rightarrow 2LiFePO_4 + CO_2 + H_2O + 2NH_3 + 4CH_3COOH \quad (3)$$

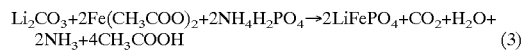

As may be seen from the reaction formula (3), toxic by-products, such as ammonia or acetic acid, are generated on sintering with the conventional synthesis method for $LiFePO_4$. So, a large-scale equipment, such as gas collector, is required for processing these toxic by-products, thus raising the cost. In addition, the yield of $LiFePO_4$ is lowered because these by-products are generated in large quantities.

According to the present invention, in which $Li_3PO_4$, $Fe_3(PO_4)_2$ or its hydrate $Fe_3(PO_4)_2 \cdot nH_2O$, where n denotes the number of hydrates, is used as the starting material for synthesis, targeted $LiFePO_4$ can be produced without generating toxic by-products. In other words, safety in sintering may be appreciably improved as compared to the conventional manufacturing method. Moreover, while a large-scale processing equipment is heretofore required for processing toxic by-products, the manufacturing method of the present invention yields only water, which is innoxious, as a by-product, thus appreciably simplifying the processing step to allow to reduce size of the processing equipment. The result is that the production cost can be appreciably lower than if ammonia etc which has to be processed is by-produced in the conventional system. Moreover, since the by-product is yielded only in minor quantities, the yield of $LiFePO_4$ may be improved significantly.

Although the sintering temperature in sintering the mixture may be 400 to 900° C. by the above synthesis method, it is preferably 600° C. or thereabouts in consideration of the cell performance. If the sintering temperature is less than 400° C., neither the chemical reaction nor crystallization proceeds sufficiently such that there is the risk that the phase of impurities such as $Li_3PO_4$ of the starting materials for synthesis may persist and thus the homogeneous $LiFePO_4$ cannot be produced. If conversely the sintering temperature exceeds 900° C., crystallization proceeds excessively so that the $LiFePO_4$ particles are coarse in size to decrease the contact area between $LiFePO_4$ and the carbon material to render it impossible to achieve sufficient discharging capacity.

During sintering, Fe in the $LiFePO_4$ carbon composite material synthesized is in the bivalent state. So, in the temperature of the order of 600° C. as the synthesis temperature, Fe in the $LiFePO_4$ carbon composite material is promptly oxidized to $Fe^{3+}$ by oxygen in the sintering atmosphere in accordance with the chemical formula shown by a following chemical formula (4):

$$6FiFePO_4 + 3/2O_2 \rightarrow 2Li_3Fe_2(PO_4)_3 + Fe_2O_3 \qquad (4)$$

so that impurities such as trivalent Fe compounds are produced to obstruct the single-phase synthesis of the $LiFePO_4$ carbon composite material.

So, inert gases, such as nitrogen or argon, or reducing gases, such as hydrogen or carbon monoxide, are used as the sintering atmosphere, while the oxygen concentration in the sintering atmosphere is prescribed to a range within which Fe in the $LiFePO_4$ carbon composite material is not oxidized, that is to not larger than 1012 ppm (volume). By setting the oxygen concentration in the sintering atmosphere to 1012 ppm (volume) or less, it is possible to prevent Fe from being oxidized even at the synthesis temperature of 600° C. or thereabouts to achieve the single-phase synthesis of the $LiFePO_4$ carbon composite material.

If the oxygen concentration in the sintering atmosphere is 1012 ppm in volume or higher, the amount of oxygen in the sintering atmosphere is excessive, such that Fe in the $LiFePO_4$ carbon composite material is oxidized to $Fe^{3+}$ to generate impurities to obstruct the single-phase synthesis of the $LiFePO_4$ carbon composite material.

As for takeout of the sintered $LiFePO_4$ carbon composite material, the takeout temperature of the sintered $LiFePO_4$ carbon composite material, that is the temperature of the $LiFePO_4$ carbon composite material when exposed to atmosphere, is desirably 305° C. or lower. On the other hand, the takeout temperature of the sintered $LiFePO_4$ carbon composite material is more desirably 204° C. or lower. By setting the takeout temperature of the $LiFePO_4$ carbon composite material to 305° C. or lower, Fe in the sintered $LiFePO_4$ carbon composite material is oxidized by oxygen in atmosphere to prevent impurities from being produced.

If the sintered $LiFePO_4$ carbon composite material is taken out in an insufficiently cooled state, Fe in the $LiFePO_4$ carbon composite material is oxidized by oxygen in atmosphere, such that impurities tend to be produced. However, if the $LiFePO_4$ carbon composite material is cooled to too low a temperature, the operating efficiency tends to be lowered.

Thus, by setting the takeout temperature of the sintered $LiFePO_4$ carbon composite material to 305° C. or lower, it is possible to prevent Fe in the sintered $LiFePO_4$ carbon composite material from being oxidized by oxygen in atmosphere and hence to prevent impurities from being generated to maintain the operation efficiency as well as to synthesize the $LiFePO_4$ carbon composite material having desirable characteristics as the cell with high efficiency.

Meanwhile, the cooling of the as-sintered $LiFePO_4$ carbon composite material is effected in a sintering furnace. The cooling method used may be spontaneous cooling or by forced cooling. However, if a shorter cooling time, that is a higher operating efficiency, is envisaged, forced cooling is desirable. In case the forced cooling is used, it is sufficient if a gas mixture of oxygen and inert gases, or only the inert gases, are supplied into the sintering furnace so that the oxygen concentration in the sintering furnace will be not higher than the aforementioned oxygen concentration, that is 1012 ppm (volume) or less.

In the above, the carbon material is added prior to the milling step. Alternatively, the carbon material may also be added after the milling step or after the sintering step.

However, if the carbon material is added after the sintering step, the reducing effect or the oxidation preventative effect during sintering cannot be obtained, such that the addition is useful only for improving the electrical conductivity. Thus, in case the carbon material is added after the sintering step, it becomes necessary to prevent $Fe^{3+}$ from being left over by some other means.

It is noted that, if the carbon material is added after the sintering step, the product synthesized on sintering is not the $LiFePO_4$ carbon composite material but is $LiFePO_4$. So, milling is again applied after the carbon material is added to $LiFePO_4$ synthesized on sintering. By this second milling, the carbon material added is comminuted and hence is more liable to become attached to the surface of $LiFePO_4$. Moreover, by this second milling, $LiFePO_4$ and the carbon material are mixed sufficiently to permit the comminuted carbon material to be attached uniformly to the surface of $LiFePO_4$. So, even in case the carbon material is added after sintering, it is possible to obtain a product similar to one obtained on addition of a carbon material prior to milling, that is the $LiFePO_4$ carbon composite material, as well as to achieve the favorable effect similar to that described above.

In the foregoing, $Li_3PO_4$, $Fe_3(PO_4)_2$ or its hydrate $Fe_3(PO_4)_2 \cdot nH_2$, where n denotes the number of hydrates, is used as the starting materials for synthesis for $Li_xFePO_4$. The present invention, however, is not to be limited to this and may be applied to such a case where lithium carbonate, ammonium dihydrogen phosphate and ferrous acetate II as the starting materials for synthesis for $LiFePO_4$ carbon are mixed together at a preset ratio, sintered and reacted in accordance with the following formula (5):

$$Li_2CO_3 + 2Fe(CH_3COO)_2 + 2NH_4H_2PO_4 \rightarrow 2LiFePO_4 + CO_2 + H_2O + 2NH_3 + 4CH_3COOH \qquad (5)$$

The non-aqueous electrolyte cell 1, employing the $LiFePO_4$ carbon composite material, obtained as described above, as the cathode active material, may be prepared e.g., as follows:

For preparing the anode 2, an anode active material and a binder are dispersed in a solvent to form a slurried anode mixture. The so produced anode mixture is coated evenly on a current collector and dried in situ to form a layer of an anode active material to form the anode 2. As the binder for the anode mixture, any suitable binder of the known type may be used, or a binder of the known type may be added to the anode mixture. Alternatively, metal lithium as an anode active material may directly be used as the anode 2.

As the cathode 4, an $LiFePO_4$ carbon composite materials as the cathode active material and a binder are mixed together to form a cathode mixture which then is dispersed in a solvent to form a slurry.

The so produced slurried cathode mixture was uniformly coated on a current collector and dried in situ to form a layer of a cathode active material to complete the cathode 4. As the binder for the cathode mixture, any suitable binder of the known type may be used, or a binder of the known type may be added to the cathode mixture.

The non-aqueous electrolyte solution may be prepared by dissolving an electrolyte salt in a non-aqueous solvent.

The anode 2 is inserted into the anode can 3, the cathode 4 is inserted into the cathode can 5 and the separator 6 comprised of a polypropylene porous film is arranged between the anode 2 and the cathode 4. A non-aqueous electrolyte solution was charged into the anode can 3 and the cathode can 5. The anode can 3 and the cathode can 5 were caulked and secured together, via insulating gasket 7, placed in-between, to complete a coin-shaped non-aqueous electrolyte cell 1.

The non-aqueous electrolyte cell 1, prepared as described above, is of high capacity because the $LiFePO_4$ carbon composite material, obtained on single-phase synthesis, is used as the cathode active material.

There is no particular limitations to the shape of the non-aqueous electrolyte cell 1 embodying the present invention, such that it may be cylindrically-shaped, square-shaped, coin-shaped or button-shaped, while it may be of desired variable sizes, such as of a thin type or of a large format.

EXAMPLES

The first aspect of the present invention is now explained based on specified experimental results. For checking for the favorable effect of the present invention, an $LiFePO_4$ carbon composite material was prepared and, using the so produced $LiFePO_4$ carbon composite material as cathode active material, a non-aqueous electrolyte cell was prepared to evaluate its characteristics.

Example A-1

An $LiFePO_4$ carbon composite material, as cathode active material, was synthesized. The manufacturing method for this cathode active material is now explained.

First, $Li_3PO_4$ and $Fe_3(PO_4)_2 \cdot 8H_2O$ were mixed to yield a lithium to iron elementary ratio of 1:1 and acetylene black powders were added in an amount of 10 wt % of the entire sintered product to yield a mixture. This mixture and alumina balls 10 mm in diameter were then charged into an alumina vessel, having a volumetric capacity of 500 cc, with the mixture to alumina ball mass ratio of 1:200, and were placed on a rotary table for ball milling. Then, using a ball mill, the mixture was milled under the following conditions:

Ball Milling Conditions rotary speed of the vessel: 150 rpm driving time: 120 hours 500 cc of the milled mixture then was charged into a die of stainless steel 15.5 mm in diameter and pressed by a manual hydraulic press to a pressure of 2.0 $t/cm^2$ to form a pellet. The press density of the mixture was found from the weight of the weight pellet by calculating the volume from the pellet thickness.

Finally, the pellet was charged into a ceramic crucible and fired for five hours at 600° C. in an electrical oven maintained in a nitrogen atmosphere to form an $LiFePO_4$ carbon composite material.

85 parts by weight of the so produced $LiFePO_4$ carbon composite material, 10 parts by weight of acetylene black, as an electrification agent, and 5 parts by weight of poly (vinylidene fluoride), as fluorine resin powders, as a binder, were mixed together and molded under pressure to form a pellet-shaped cathode.

A foil of metal lithium was then punched to substantially the same shape as the cathode to form an anode.

Then, $LiPF_6$ was dissolved in a solvent mixture comprised of equal volumes of propylene carbonate and dimethyl carbonate, at a concentration of 1 mol/l, to prepare a non-aqueous electrolyte solution.

The cathode, thus prepared, was charged into the cathode can, while the anode was held in the anode can and the separator was arranged between the cathode and the anode. The non-aqueous electrolytic solution was injected into the anode can and into the cathode can. The anode can and the cathode can were caulked and secured together to complete a 2016 type coin-shaped test cell with 20.0 mm in its diameter and 1.6 mm in thickness.

Example A-2

A coin-shaped test cell was prepared in the same way as in Example A-1, except using the pressure of 2.1 $t/cm^2$ as the pressure for molding the milled mixture.

Example A-3

A coin-shaped test cell was prepared in the same way as in Example A-1, except using the pressure of 2.2 $t/cm^2$ as the pressure for molding the milled mixture.

Example A-4

A coin-shaped test cell was prepared in the same way as in Example A-1, except using the pressure of 2.3 $t/cm^2$ as the pressure for molding the milled mixture.

Example A-5

A coin-shaped test cell was prepared in the same way as in Example A-1, except using the pressure of 2.4 $t/cm^2$ as the pressure for molding the milled mixture.

Comparative Example A-1

A coin-shaped test cell was prepared in the same way as in Example A-1, except using the pressure of 1.5 $t/cm^2$ as the pressure for molding the milled mixture.

Comparative Example A-2

A coin-shaped test cell was prepared in the same way as in Example A-1, except using the pressure of 1.6 $t/cm^2$ as the pressure for molding the milled mixture.

Comparative Example A-3

A coin-shaped test cell was prepared in the same way as in Example A-1, except using the pressure of 1.7 $t/cm^2$ as the pressure for molding the milled mixture.

Comparative Example A-4

A coin-shaped test cell was prepared in the same way as in Example A-1, except using the pressure of 1.8 $t/cm^2$ as the pressure for molding the milled mixture.

Comparative Example A-5

A coin-shaped test cell was prepared in the same way as in Example A-1, except using the pressure of 1.9 $t/cm^2$ as the pressure for molding the milled mixture.

X-ray diffractometry was carried out on the cathode active material synthesized in Examples A-1 to A-5 and Comparative Examples A1 to A-5. The results are shown in Table A-1, in which the test cells were matched to the powder X-ray diffraction lines stated in JCPDS-No.401499 and in which no other diffraction lines were observed, are marked with ○ as being test cells where $LiFePO_4$ was prepared by single-phase synthesis, while the test cells in which the test cells were not matched to the powder X-ray diffraction lines stated in JCPDS-No.401499 or in which, if the test cells were matched to the powder X-ray diffraction lines but other diffraction lines were observed, are marked with x as being test cells where $LiFePO_4$ was not prepared by single-phase synthesis.

TABLE A-1

| | molding pressure (t/cm2) | press density (g/cm3) | synthesizability | discharge capacity density (mAh/g) |
|---|---|---|---|---|
| Comp. Ex. A-1 | 1.5 | 1.45 | x | 2.3 |
| Comp. Ex. A-2 | 1.6 | 1.50 | x | 2.6 |
| Comp. Ex. A-3 | 1.7 | 1.54 | x | 3.0 |

TABLE A-1-continued

| | molding pressure (t/cm2) | press density (g/cm3) | synthesiza-bility | discharge capacity density (mAh/g) |
|---|---|---|---|---|
| Comp. Ex. A-4 | 1.8 | 1.59 | x | 3.3 |
| Comp. Ex. A-5 | 1.9 | 1.65 | x | 3.7 |
| Ex. A-1 | 2.0 | 1.71 | ○ | 4.1 |
| Ex. A-2 | 2.1 | 1.73 | ○ | 4.2 |
| Ex. A-3 | 2.2 | 1.76 | ○ | 4.2 |
| Ex. A-4 | 2.3 | 1.77 | ○ | 4.2 |
| Ex. A-5 | 2.4 | 1.80 | ○ | 4.2 |

It is seen from Table A-1 that the Examples A-1 to A-5 in which the pressure used in molding the milled mixture is not less than 2.0 t/cm$^2$, that is the press density is not less than 1.71 g/cm$^3$, are matched to the powder X-ray diffraction lines prescribed in JCPDS-No.401499 and are free from other diffraction lines, so that, in these Examples, the LiFePO$_4$ carbon composite material was synthesized in a single phase.

Conversely, with the Comparative Examples A-1 to A-5, in which the pressure used in molding the milled mixture was not higher than 1.9 t/cm$^2$, that is in which the pres density is not higher than 1.65 g/cm$^3$, diffraction lines ascribable to Li$_3$PO$_4$ or Li$_3$Fe$_2$(PO$_4$)$_3$, not prescribed in JCPDS-No.401499, are identified in the sintered product, thus indicating that there occurred no single-phase synthesis of the LiFePO$_4$ carbon composite material. This is presumably attributable to the fact that, since the press density was too low and hence no sufficient contact area was provided for the starting materials for synthesis of the LiFePO$_4$ carbon composite material, the synthesis reaction of LiFePO$_4$ was not allowed to proceed such that an impurity was left over in the sintered product.

It is said from above that, by setting the press density of the starting materials for synthesis of the LiFePO$_4$ carbon composite material, charged to the sintering step, to not less than 1.71 g/cm$^3$, single-phase synthesis of the starting materials for synthesis of the LiFePO$_4$ carbon composite material may occur satisfactorily.

In the coin-shaped test cells of the Examples A-1 to A-5 and Comparative Examples A-1 to A-5, prepared as described above, the following charging/discharging tests were carried out to evaluate the initial discharging capacity density.

<Charging/Discharging Test>

Each test cell was charged at a constant current. When the cell voltage reached 4.2 V, the constant current charging was switched to constant voltage charging, and charging was carried out as the voltage was maintained at 4.2 V. The charging was discontinued at a time point the cell voltage fell to 2.0 V. Both the charging and the discharging were carried out at ambient ten (25° C.) and the current density at this time was set to 0.1 mA/cm$^2$. The results are also shown in Table A-1.

As may be seen from Table A-1, with the Examples A-1 to A-5 in which the pressure used in molding the milled mixture was 2.0 t/cm$^2$ or higher, that is in which the press density was 1.71 g/cm$^3$ or higher, the initial discharging capacity density showed satisfactory values.

Conversely, with the Comparative Examples 1 to 5, in which the pressure used in molding the milled mixture was 1.9 t/cm$^2$ or lower, that is in which the press density was 1.65 g/cm$^3$ or lower, the initial discharging capacity density showed only low values. This is presumably attributable to the fact that, since the press density was too low, synthesis of LiFePO$_4$ fails to proceed such that the LiFePO$_4$ carbon composite material as the cathode active material fails to be produced in a single phase and hence the amount of the cathode active material contributing to the cell reaction is only small.

It is said from above that, since the starting materials for synthesis of the LiFePO$_4$ carbon composite material may be synthesized satisfactorily in a single phase by setting the press density of the materials for synthesis of the LiFePO$_4$ carbon composite material charged into the firing step to 1.71 g/cm$^3$ or higher, the cathode active material having superior initial discharge capacity density and hence the non-aqueous electrolyte cell having superior initial discharge capacity density may be produced.

Next, another case was searched, in which case the pressure used in molding the milled product was greatly raised.

Example A-6

A coin-shaped test cell was prepared in the same way as in Example A-1 except setting the diameter of the die of stainless steel to 10 mm and setting the molding pressure to 4.8 t/cm$^2$, for elevating the pressure used in molding the milled mixture.

Example A-7

A coin-shaped test cell was prepared in the same way as in Example A-1 except setting the diameter of the die of stainless steel to 10 mm and setting the molding pressure to 5.0 t/cm$^2$, for elevating the pressure used in molding the milled mixture.

Comparative Example A-6

A coin-shaped test cell was prepared in the same way as in Example A-1 except setting the diameter of the die of stainless steel to 10 mm and setting the molding pressure to 5.3 t/cm$^2$, for elevating the pressure used in molding the milled mixture.

Comparative Example A-7

A coin-shaped test cell was prepared in the same way as in Example A-1 except setting the diameter of the die of stainless steel to 10 mm and setting the molding pressure to 5.5 t/cm$^2$, for elevating the pressure used in molding the milled mixture.

X-ray diffractometry was carried out on the cathode active material synthesized in Examples A-6, A-7 and Comparative Examples A-6, A-7. The results are shown in Table A-1, in which the test cells were matched t the powder X-ray diffraction lines stated in JCPDS-No.401499 and in which no other diffraction lines were observed are marked with ○ as being test cells where LiFePO$_4$ was prepared by single-phase synthesis, while the test cells in which the test cells were not matched to the powder X-ray diffraction lines stated in JCPDS-No.401499 or in which, if the test cells were matched to the powder X-ray diffraction lines but other diffraction lines were observed are marked with x as being test cells where LiFePO$_4$ was not prepared by single-phase synthesis.

TABLE A-2

| | molding pressure (t/cm2) | press density (g/cm3) | synthesizability | discharge capacity density (mAh/g) |
|---|---|---|---|---|
| Ex. A-6 | 4.8 | 2.41 | ○ | 3.9 |
| Ex. A-7 | 5.0 | 2.45 | ○ | 3.2 |
| Comp. Ex. A-6 | 5.3 | 2.48 | ○ | 2.3 |
| Comp. Ex. A-7 | 5.5 | 2.50 | ○ | 2.0 |

It may be seen from Table A-2 that all of the cathode active materials were matched to the powder X-ray diffraction lines prescribed in JCPDS-No.401499, with there being no other diffraction lines identified, thus testifying to the fulfillment of the single-phase synthesis of the LiFePO$_4$ carbon composite material. This is presumably attributable to the fact that, since the press density was high, sufficient contact area could be assured between the starting materials for synthesis of the LiFePO$_4$ carbon composite material, while the synthesis reaction of LiFePO$_4$ proceeded satisfactorily so that no impurity was left over in the sintered product.

On the coin-shaped test cells of the Examples A-6, A-7 and Comparative Examples A-6, A-7, charging/discharging tests were carried out in the same way as described above to evaluate the initial discharge capacity density. The results are also shown in Table A-2.

It may be seen from Table A-2 that the Examples A-6 and A-7, for which the pressure used in molding the milled mixture is 5.0 t/cm$^2$, that is in which the press density is 2.45 g/cm$^3$ or less, exhibits optimum initial discharge capacity density.

Conversely, with the Comparative Examples A-6 and A-7, for which the pressure used in molding the milled mixture is 5.3 t/cm$^2$, that is in which the press density is 2.48 g/cm$^3$ or higher, the initial discharge capacity density is lower. This is presumably attributable to the fact that, if the pressure used in molding the milled mixture is raised to 5.3 t/cm$^2$, that is if the press density is raised to 2.48 g/cm$^3$, the contact area between the starting materials for synthesis of the LiFePO$_4$ carbon composite material is excessively large, with the synthesis reaction of LiFePO$_4$ carbon proceeding excessively to cause the grains of LiFePO$_4$ to grow excessively, as a result of which the contact area between the LiFePO$_4$ carbon composite material and the electrically conductive material is decreased to lower the electronic conductivity of the LiFePO$_4$ carbon composite material.

It is said from above that, by setting the press density of the starting materials for synthesis of the LiFePO$_4$ carbon composite material, charged into the sintering step, to not less than 1.71 g/cm$^3$ and to not higher than 2.45 g/cm$^3$, the starting materials for synthesis of the LiFePO$_4$ carbon composite material can be synthesized satisfactorily, thus realizing a cathode active material superior in initial discharge capacity density and hence a non-aqueous electrolyte cell having superior initial discharge capacity density can be produced.

As the cathode active materials, Li$_x$Fe$_{1-y}$M$_y$PO$_4$ carbon composite materials other than the LiFePO$_4$ carbon composite material were synthesized and cells employing these cathode active materials were prepared to evaluate their characteristics.

Example A-8

A coin-shaped test cell was prepared in the same way as in Example A-1 except employing LiFe$_{0.2}$Mn$_{0.8}$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-9

A coin-shaped test cell was prepared in the same way as in Example A-1 except employing LiFe$_{0.2}$Cr$_{0.8}$PO$_4$ in place of the LiFePO$_4$ carbon composite as the cathode active material, and subjected to the charging/discharging test as described above. It was found that favorable effects similar to those of the Examples A-1 to A-7 were achieved.

Example A-10

A coin-shaped test cell was prepared in the same way as in Example A-1 except employing LiFe$_{0.2}$Co$_{0.8}$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-11

A coin-shaped test cell was prepared in the same way as in Example A-1 except employing LiFe$_{0.2}$Cu$_{0.8}$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-12

A coin-shaped test cell was prepared in the same way as in Example A-1 except employing LiFe$_{0.2}$Ni$_{0.8}$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-13

A coin-shaped test cell was prepared in the same way as in Example A-1 except employing LiFe$_{0.25}$V$_{0.75}$PO$_4$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-14

A coin-shaped test cell was prepared in the same way as in Example A-1 except employing LiFe$_{0.25}$Mo$_{0.75}$PO$_4$ in place of the LiFePO$_4$ carbon composite material as the cathode active material, and subjected to the charging/discharging test as described above. It was found that favorable effects similar to those of the Examples A-1to A-7 were achieved.

Example A-15

A coin-shaped test cell was prepared in the same way as in Example A-1 except employing LiFe$_{0.25}$Ti$_{0.75}$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-16

A coin-shaped test cell was prepared in the same way as in Example A-1 except employing LiFe$_{0.3}$Zn$_{0.7}$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-17

A coin-shaped test cell was prepared in the same way as in Example A-1 except employing LiFe$_{0.3}$Al$_{0.7}$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-18

A coin-shaped test cell was prepared in the same way as in Example A-1 except employing LiFe$_{0.3}$Ga$_{0.7}$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-19

A coin-shaped test cell was prepared in the same way as in Example A-1 except employing LiFe$_{0.25}$Mg$_{0.75}$PO$_4$ in place of the LiFePO$_4$ carbon composite material as the cathode active material, and subjected to the charging/discharging test as described above. It was found that favorable effects similar to those of the Examples A-1 to A-7 were achieved.

Example A-20

A coin-shaped test cell was prepared in the same way as in Example A-1 except employing LiFe$_{0.25}$B$_{0.75}$PO$_4$ in place of the LiFePO$_4$ carbon composite material and as the cathode active material, and subjected to the charging/discharging test as described above. It was found that favorable effects similar to those of the Examples A-1 to A-7 were achieved.

Example A-21

A coin-shaped test cell was prepared in the same way as in Example A-1 except employing LiFe$_{0.25}$Nb$_{0.75}$PO$_4$ in place of the LiFePO$_4$ carbon composite material as the cathode active material, and subjected to the charging/discharging test as described above. It was found that favorable effects similar to those of the Examples A-1 to A-7 were achieved.

Next, a polymer cell was prepared to evaluate its characteristics.

Example A-22

A gelated electrode was prepared as follows: First, polyvinylidene fluoride, in copolymerized with 6.9 wt % of hexafluoropropylene, a non-aqueous electrolyte and dimethyl carbonate, were mixed, agitated and dissolved to a sol-like electrolytic solution. To the sol-like electrolytic solution was added 0.5 wt % of vinylene carbonate VC to form a gelated electrolytic solution. As the non-aqueous electrolyte solution, such a solution obtained on mixing ethylene carbonate EC and propylene carbonate PC at a volumetric ratio of 6:4 and on dissolving LiPF$_6$ at a rate of 0.85 mol/kg in the resulting mixture, was used.

A cathode was then prepared as follows: First, 85 parts by weight of the LiFePO$_4$ carbon composite material, prepared in Example A-1, 10 parts by weight of acetylene black, as an electrification agent, and 5 parts by weight of poly (vinylidene fluoride), in the form of fluorine resin powders, as a binder, were mixed together, and added to with N-methyl pyrrolidone to yield a slurry, which slurry was then coated on an aluminum foil 20 μm in thickness, dried in situ under heating and pressed to form a cathode coating film. A gelated electrolytic solution then was, applied to one surface of the cathode coating film and dried in situ to remove the solvent. The resulting product was punched to a circle 15 mm in diameter, depending on the cell diameter, to form a cathode electrode.

The anode then was prepared as follows: First, 10 wt % of fluorine resin powders, as a binder, were mixed into graphite powders, and added to with N-methyl pyrrolidone to form a slurry, which then was coated on a copper foil, dried in situ under heating, pressed and punched to a circle 16.5 mm in diameter, depending on the cell diameter, to form an anode electrode.

The cathode, thus prepared, was charged into the cathode can, while the anode was held in the anode can and the separator was arranged between the cathode and the anode. The anode can and the cathode can were caulked and secured together to complete a 2016 type coin-shaped lithium polymer cell having a diameter of 20 mm and a thickness of 1.6 mm.

Example A-23

In preparing the cathode, the LiFePO$_4$ carbon composite material, prepared in Example A-5, was used. A coin-shaped lithium polymer cell was prepared in otherwise the same way as in Example A-22.

The coin-shaped test cells of the Examples A-22 and A-23, prepared as described above, the charging/discharging tests were conducted as now explained to find the initial discharging capacity and the capacity upkeep ratio after 30 cycles.

<Test of Charging/Discharging Cyclic Characteristics>

The charging/discharging cyclic characteristics were evaluated based on the capacity upkeep ratio after repeated charging/discharging.

Each coin-shaped lithium polymer cell was charged at a constant current and, at a time point the cell voltage reached 4.2 V, the constant current charging was switched to constant voltage charging and charging was carried out as the cell voltage was kept at 4.2 V. The charging was terminated at a time point the current value fell to 0.01 mA/cm$^2$ or less. Each test was then discharged. The discharging was terminated at a time point the cell voltage fell to 2.0 V.

With the above process as one cycle, 30 cycles were carried out, and the discharging capacity at the first cycle and that at the 30th cycle were found. The ratio of the discharging capacity at the 30th cycle (C2) to the discharging capacity at the first cycle (C1), or (C2/C1)×100, was found as the discharge capacity upkeep ratio. Meanwhile, both the charging and the discharging were carried out at ambient temperature (25° C.), as the current density at this time was set to 0.1 mA/cm$^2$. The results are shown in Table 3.

TABLE A-3

|  | press density (g/cm$^3$) | initial discharge capacity density (mAh/g) | discharge capacity upkeep ratio after 30 cycles (%) |
| --- | --- | --- | --- |
| Ex. A-22 | 1.71 | 154 | 95.2 |
| Ex. A-23 | 1.80 | 155 | 94.9 |

As may be seen from Table A-3, the Examples A-22 and A-23, employing the cathode active materials of Examples A-1 and A-5 exhibit satisfactory values of both the initial discharge capacity density and the capacity upkeep ratio after 30 cycles. It may be confirmed from this that the cathode active material according to the present invention yields the favorable effect of improving the discharge capacity even in case of employing a gelated electrolyte in place of the non-aqueous electrolyte solution as the non-aqueous electrolyte.

As the cathode active materials, $Li_xFe_{1-y}M_yPO_4$ carbon composite materials other than the $LiFePO_4$ carbon composite material were synthesized and cells employing these cathode active materials were prepared to evaluate their characteristics.

Example A-24

A coin-shaped lithium polymer cell was prepared in the same way as in Example A-22 except employing $LiFe_{0.2}Mn_{0.8}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-25

A coin-shaped lithium polymer cell was prepared in the same way as in Example A-22 except employing $LiFe_{0.2}Cr_{0.8}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-26

A coin-shaped lithium polymer cell was prepared in the same way as in Example A-22 except employing $LiFe_{0.2}Co_{0.8}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-27

A coin-shaped lithium polymer cell was prepared in the same way as in Example A-22 except employing $LiFe_{0.2}Cu_{0.8}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-28

A coin-shaped lithium polymer cell was prepared in the same way as in Example A-22 except employing $LiFe_{0.2}Ni_{0.8}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-29

A coin-shaped lithium polymer cell was prepared in the same way as in Example A-22 except employing $LiFe_{0.25}V_{0.75}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-30

A coin-shaped lithium polymer cell was prepared in the same way as in Example A-22 except employing $LiFe_{0.25}Mo_{0.75}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-31

A coin-shaped lithium polymer cell was prepared in the same way as in Example A-22 except employing $LiFe_{0.25}Ti_{0.75}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-32

A coin-shaped lithium polymer cell was prepared in the same way as in Example A-22 except employing $LiFe_{0.3}Zn_{0.7}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-33

A coin-shaped lithium polymer cell was prepared in the same way as in Example A-22 except employing $LiFe_{0.3}Al_{0.7}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-34

A coin-shaped lithium polymer cell was prepared in the same way as in Example A-22 except employing $LiFe_{03}Ga_{0.7}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-35

A coin-shaped lithium polymer cell was prepared in the same way as in Example A-22 except employing $LiFe_{0.25}Mg_{0.75}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

Example A-36

A coin-shaped lithium polymer cell was prepared in the same way as in Example A-22 except employing $LiFe_{0.25}B_{0.75}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 to A-23 were achieved.

Example A-37

A coin-shaped lithium polymer cell was prepared in the same way as in Example A-22 except employing $LiFe_{0.25}Nb_{0.75}PO_4$ in place of the $LiFePO_4$ carbon composite material as the cathode active material and setting the pressure used in molding the milled mixture to 2.0 t/cm$^2$, that is setting the press density to 1.71 g/cm$^3$, and subjected to the charging/discharging cyclic test as described above. It was found that favorable effects similar to those of the Examples A-22 and A-23 were achieved.

The second aspect of the present invention is now explained based on specified experimental results.

Example B-1
Preparation of Cathode Active Material

First, $Li_3PO_4$ and $Fe_3(PO_4)_2 \cdot 8H_2O$ were mixed to yield a lithium to iron elementary ratio equal to 1:1. To the resulting mixture were added ketchen black powders, having the first-order particle size of 0.3 μm. The mixture and the alumina balls, each 10 mm in diameter, were charged into an alumina pot 100 mm in diameter, with the weight ratio of the mixture to the alumina balls equal to 1:2. The mixture was milled using a planetary ball mill. As this planetary ball mill, a planetary rotating pot mill for test, manufactured by ITO SEISAKUSHO KK under the trade name of LA-PO$_4$, was used, and the mixture was milled under the following conditions:

Conditions for Planetary Ball Milling
 radius of rotation about sun gear: 200 mm
 number of revolutions about the sun gear: 230 rpm
 number of revolutions about a planetary gear itself: 230 rpm
 driving time duration: 10 hours.

Figure 4:
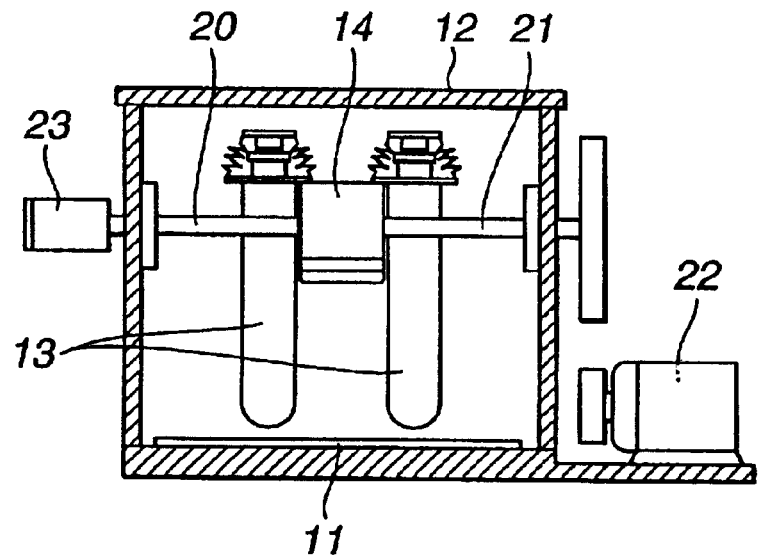
FIG. 4 is a schematic view showing a device for measuring the tap density of starting materials for synthesis of the cathode active material.

The tap density of the milled mixture was measured using an Ishiyama type volume tester shown in FIG. 4.

Figure 5:
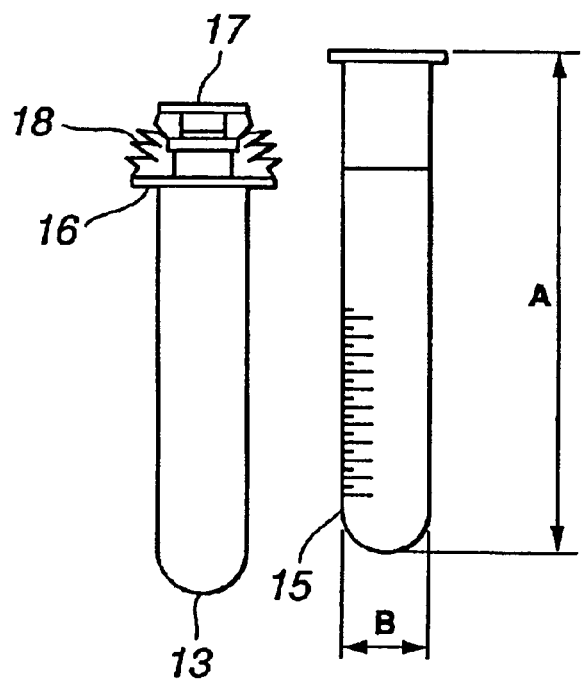
FIG. 5 is a front view showing a metal tube and a test tube of the measurement device shown in FIG. 4.

As shown in FIG. 5, this tester is comprised of a test box 12, having a rubber sheet 11 laid on its bottom, two metal pipes 13 each holding therein a graduated test tube with a capacity of 20 ml, and a rotary blade 14 for allowing descent of these metal tubes 13 from a preset height.

The metal tube 13 is of a size sufficient to hold a graduated test tube 15 of the capacity of 20 ml (capacity of 20 ml, weight of 15 to 16 g, height A of 174 to 176 mm, outer diameter B of 16 to 17 mm and an inner diameter of 14.7 to 15.7 mm), and is supported for movement vertically in the test box 12. This metal tube 13 is fitted with an upper flange 16 and may have its opening closed by a lid 17. This lid 17 and the flange 16 are interconnected by a spring 18. The lid 17 is detached by extension or contraction of the spring 18 to permit and insertion or removal of the test tube 15. The lid 17 is adapted not to be disengaged by the resilient force of the spring 18 when the metal tube 13 is moved vertically.

Figure 6:
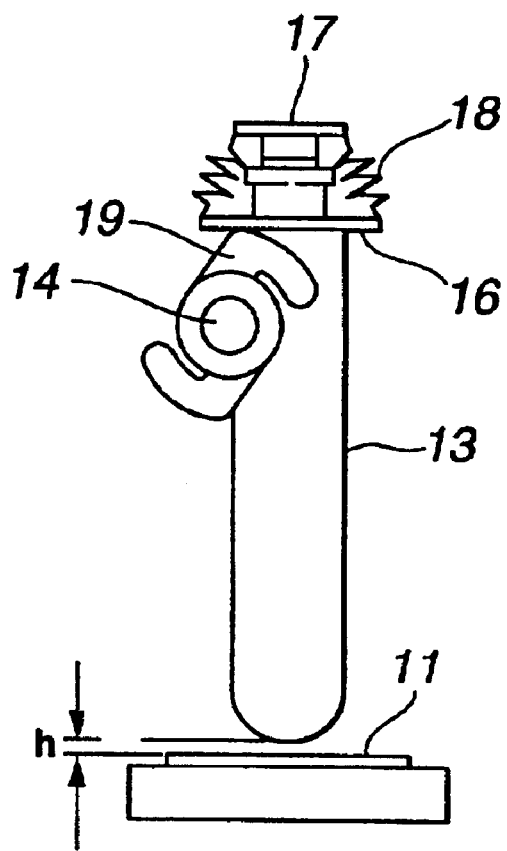
FIG. 6 is a side view showing the metal tube and a rotary blade of the measurement device shown in FIG. 4.

As shown in FIG. 6, The rotary blade 14, arranged between the twp metal tubes 13, has two equally spaced apart hook-shaped blades 19, and is supported at a preset height position by rotary shafts 20, 21 traversing the left and right wall sections of the test box 12. That is, this rotary blade 14 compresses against the lower surface of the flange 16 of the metal tube 13 when the two blades 19 are at respective upper positions. The rotary blade 14 is supported at a position such that, when rotated, uplifts this flange 16 whereby height h of the bottom surface of the metal tube 13 from the rubber sheet 11 of the will be 45 mm.

The rotary shaft 21, carrying the rotary blade 14, is connected to a motor 22 placed outside of the test box 12, so as to be rotated through the rotary shaft 21 by the driving force of the motor 22. The other rotary shaft 20, supporting the rotary blade 14, carries a counter 23 allowing to measure the rpm of the rotary blade 14.

So, the rotary blade 14 of the metal tubes 13 is run in rotation by the motor 22 so that the two blades 19, 19 are uplifted to a position 45 mm above the bottom, each time the two blades 19 are contacted with and separated away from the flange 16, with the blades 19, 19 descending onto the rubber plate 11 from this position. The number of times of descent is measured by the counter 23.

The tap density of the cathode active material is measured using the above tester as follows:

First, 5 to 10 g, such as 10 g, of a sample, accurately weighed, are quietly charged into a graduated test tube 15 of 20 ml. The volume at this time, that is apparent tap density, is read out with the graduations. The test tube 15, having the sample thus set therein, is held in the metal tube 13. The lid 17 is closed, the rotary blade 14 is run in rotation and the metal tube 13 is caused to descent from a position 45 mm above the bottom. This sequence of descent operations is repeated 40 times at a rate of one descent per two seconds. After descent of the metal tube 13 in this manner, the volume of the sample in the test tube 3 (permanent tap density) is then read with the graduations.

The tap density is measured based on the equation: tap density (g/cc)=sample (g)/volume (cc). Meanwhile, this test is conducted for four test tubes and the results of the test are averaged to give a tap density of the starting materials for synthesis following the milling. With this measurement, the tap density of the mixture following the milling in the Example B-1 was 0.40 g/cc.

The mixture following the measurement of the tap density was charged into a ceramic crucible and sintered for five hours at 600° C. in an electrical oven maintained in a nitrogen atmosphere to produce an $LiFePO_4$ carbon composite material as a cathode active material.

<Preparation of Test Cell with Use of a Non-Aqueous Electrolyte Solution>

A non-aqueous electrolyte cell, employing the $LiFePO_4$ carbon composite material, obtained as described above, was prepared.

First, 95 parts by weight of the $LiFePO_4$ carbon composite material, prepared in Example B-1 as the cathode active material, 10 parts by weight of acetylene black, and 5 parts by weight of poly (vinylidene fluoride), in the form of fluorine resin powders, as a binder, were mixed together and molded under pressure to form a pellet-shaped cathode having a diameter of 15.5 mm and a thickness of 0.1 mm.

A foil of metal lithium was then punched to substantially the same shape as the cathode to form an anode.

Then, a non-aqueous electrolyte solution was prepared by dissolving $LiPF_6$ in a solvent mixture comprised of equal volumes of propylene carbonate and dimethyl carbonate, at a concentration of 1 mol/l, to prepare a non-aqueous electrolyte solution.

The cathode, thus prepared, was charged into the cathode can, while the anode was held in the anode can and the separator was arranged between the cathode and the anode. The non-aqueous electrolytic solution was injected into the anode can and into the cathode can. The anode can and the cathode can were caulked and secured together to complete a 2016 type coin-shaped non-aqueous electrolyte cell having a diameter of 20.0 mm and a thickness of 1.6 mm.

Example B-2

An $LiFePO_4$ carbon composite material was prepared in the same way as in Example B-1, except setting the number of revolutions about the sun gear and that about the planetary gear itself of the planetary ball mill to 250 rpm, and a coin-shaped test cell was prepared using the so produced $LiFePO_4$ carbon composite material as cathode active material.

Example B-3

An $LiFePO_4$ carbon composite material was prepared in the same way as in Example B-1, except setting the number of revolutions about the sun gear and that about the planetary gear itself of the planetary ball mill to 270 rpm, and a coin-shaped test cell was prepared using the so produced $LiFePO_4$ carbon composite material as cathode active material.

Example B-4

An $LiFePO_4$ carbon composite material was prepared in the same way as in Example B-1, except setting the number of revolutions about the sun gear and that about the planetary gear itself of the planetary ball mill to 320 rpm, and a coin-shaped test cell was prepared using the so produced $LiFePO_4$ carbon composite material as cathode active material.

Comparative Example B-1

An $LiFePO_4$ carbon composite material was prepared in the same way as in Example B-1, except setting the number of revolutions about the sun gear and that about the planetary gear itself of the planetary ball mill to 200 rpm, and a coin-shaped test cell was prepared using the so produced $LiFePO_4$ carbon composite material as cathode active material.

Comparative Example B-2

An $LiFePO_4$ carbon composite material was prepared in the same way as in Example B-1, except setting the number of revolutions about the sun gear and that about the planetary gear itself of the planetary ball mill to 350 rpm, and a coin-shaped test cell was prepared using the so produced $LiFePO_4$ carbon composite material as cathode active material.

X-ray diffractometry was carried out on the synthesized $LiFePO_4$ carbon composite material synthesized as described above. The cathode active material samples matched to the powder X-ray diffraction lines stated in JCPDS-No.401499 and in which no other diffraction lines were observed are marked with ○ as being a prepared by single-phase synthesis, while the cathode active material samples not matched to the powder X-ray diffraction lines stated in JCPDS-No.401499 or in which other diffraction lines were observed despite matching to the powder X-ray diffraction lines are marked with x as being not prepared by single-phase synthesis.

On the coin-shaped test cells, prepared as described above, the charging/discharging tests were conducted as now explained to perform a variety of measurements.

<Charging/Discharging Test>

Each test cell was charged at a constant current and, at a time point the cell voltage reached 4.2 V, the constant current charging was switched to constant voltage charging and charging was carried out as the cell voltage was kept at 4.2 V. The charging was terminated at a time point the current value fell to 0.01 $mA/cm^2$ or less. Each test was then discharged. The discharging was terminated at a time point the cell voltage fell to 2.0 V, and measurements were made of the initial discharge capacity per unit weight of the cathode active material. Both the charging and the discharge were carried out at ambient temperature (25° C.) with the current density at this time being set to 0.1 $mA/cm^2$.

With the above-described charging/discharging cycle as one cycle, measurements were made of the discharge capacity per unit weight of the cathode active material after 50 cycles. The capacity upkeep ratio, which stands for the proportion of the discharge capacity after 50 cycles to the initial discharge capacity, was found to evaluate cyclic characteristics.

A practically useful cell is required have the initial discharge capacity not lower than 140 mAh/g and the capacity upkeep ratio not lower than 80%. It is more desirable that the initial discharge capacity and the capacity upkeep ratio be not less than 150 mAh/g and not lower than 90%, respectively.

The results of the above measurements and the tap density are shown in Table B-1.

TABLE B-1

| | tap density (g/cc) | decision by XRD | initial discharge capacity (mAh/g) | capacity upkeep ratio (%) |
|---|---|---|---|---|
| Ex. B-1 | 0.40 | ○ | 149.5 | 92.2 |
| Ex. B-2 | 0.63 | ○ | 153.3 | 94.5 |
| Ex. B-3 | 1.02 | ○ | 151.2 | 94.1 |
| Ex. B-4 | 2.00 | ○ | 146.2 | 90.2 |
| Comp. Ex. B-1 | 0.35 | x | 120.3 | 78,1 |
| Comp. Ex. B-2 | 2.21 | ○ | 133.2 | 75.3 |

It may be seen from Table B-1 that, in the starting materials for synthesis of the $LiFePO_4$ carbon composite material, the cathode active material samples of Examples B-1 to B-4, in which the tap density of the starting materials for synthesis following the milling is not less than 0.4 g/cc and not larger than 2.0 g/cc, are matched to the powder X-ray diffraction lines described in JCPDS-NO.401499, while being free from other diffraction lines, thus testifying to fulfilment of the single-phase synthesis of the $LiFePO_4$ carbon composite material. It may also be seen that the test cell employing the cathode active material has a large initial discharge capacity and a high capacity upkeep ratio.

Conversely, the cathode active material of the Comparative Example B-1, in which the tap density of the starting materials for synthesis of the LiFePO$_4$ carbon composite material is less than 0.4 g/cc is not matched to the diffraction lines, or is not free of other diffraction lines, despite matching achieved, thus testifying to non-fulfilment of the single-phase synthesis of the LiFePO$_4$ carbon composite material. It may also be seen that the test cell employing the cathode active material has only small initial discharge capacity and hence is not practically useful.

It may also be seen that the cathode active material of the Comparative Example B-2, in which the tap density of the starting materials for synthesis of the LiFePO$_4$ carbon composite material exceeds 2.0 g/cc, is low in capacity upkeep ratio when used in a test cell, despite fulfilment of the single-phase synthesis of the LiFePO$_4$ carbon composite material. Thus, the cathode active material is not practically useful.

It may be said from above that, by setting the tap density of the starting materials for synthesis following the milling to not less than 0.4 g/cc and not larger than 2.0 g/cc, in the synthesis of the LiFePO$_4$ carbon composite material, single-phase synthesis of the LiFePO$_4$ carbon composite material can be achieved satisfactorily so that a cathode active material not containing an impurity may be produced, and that, by employing the so produced cathode active material, a non-aqueous electrolyte secondary cell may be produced which is of high capacity and superior in cyclic characteristics.

A plural number of Li$_x$Fe$_{1-y}$M$_y$PO$_4$ carbon composite materials other than the LiFePO$_4$ carbon composite material were prepared as cathode active material samples and cells were produced using these cathode active material samples to evaluate the so produced cells.

Example B-5

A coin-shaped test cell was prepared in the same way as in Example B-1 except synthesizing an LiFe$_{0.2}$Mn$_{0.8}$PO$_4$ carbon composite material as a cathode active material.

Example B-6

A coin-shaped test cell was prepared in the same way as in Example B-1 except synthesizing an LiFe$_{0.2}$Cr$_{0.8}$PO$_4$ carbon composite material as a cathode active material.

Example B-7

A coin-shaped test cell was prepared in the same way as in Example B-1 except synthesizing an LiFe$_{0.2}$Co$_{0.8}$PO$_4$ carbon composite material as a cathode active material.

Example B-8

A coin-shaped test cell was prepared in the same way as in Example B-1 except synthesizing an LiFe$_{0.2}$Cu$_{0.8}$PO$_4$ carbon composite material as a cathode active material.

Example B-9

A coin-shaped test cell was prepared in the same way as in Example B-1 except synthesizing an LiFe$_{0.2}$Ni$_{0.8}$PO$_4$ carbon composite material as a cathode active material.

Example B-10

A coin-shaped test cell was prepared in the same way as in Example B-1 except synthesizing an LiFe$_{0.25}$V$_{0.75}$PO$_4$ carbon composite material as a cathode active material.

Example B-11

A coin-shaped test cell was prepared in the same way as in Example B-1 except synthesizing an LiFe$_{0.25}$Mo$_{0.75}$PO$_4$ carbon composite material as a cathode active material.

Example B-12

A coin-shaped test cell was prepared in the same way as in Example B-1 except synthesizing an LiFe$_{0.25}$Ti$_{0.75}$PO$_4$ carbon composite material as a cathode active material.

Example B-13

A coin-shaped test cell was prepared in the same way as in Example B-1 except synthesizing an LiFe$_{0.3}$Zn$_{0.7}$PO$_4$ carbon composite material as a cathode active material.

Example B-14

A coin-shaped test cell was prepared in the same way as in Example B-1 except synthesizing an LiFe$_{0.3}$Al$_{0.7}$PO$_4$ carbon composite material as a cathode active material.

Example B-5

A coin-shaped test cell was prepared in the same way as in Example B-1 except synthesizing an LiFe$_{0.3}$Ga$_{0.7}$PO$_4$ carbon composite material as a cathode active material.

Example B-16

A coin-shaped test cell was prepared in the same way as in Example B-1 except synthesizing an LiFe$_{0.25}$Mg$_{0.75}$PO$_4$ carbon composite material as a cathode active material.

Example B-17

A coin-shaped test cell was prepared in the same way as in Example B-1 except synthesizing an LiFe$_{0.25}$B$_{0.75}$PO$_4$ carbon composite material as a cathode active material and the characteristics of a cell produced using this cathode active material were evaluated.

Example B-18

A coin-shaped test cell was prepared in the same way as in Example B-1 except synthesizing an LiFe$_{0.25}$Nb$_{0.75}$PO$_4$ carbon composite material as a cathode active material.

On the coin-shaped test cells of Examples B-5 to B-18, the aforementioned charging/discharging test was carried out in similar manner to measure the initial discharge capacity and capacity upkeep ratio. As a result, it was found that, in any of the above embodiments, single-phase synthesis of the cathode active material was carried out satisfactorily and that the test cells prepared using the cathode active materials were of high capacity and superior cyclic characteristics.

Thus, it may be said that, by setting the tap density of the starting materials for synthesis of the LiFe$_{1-y}$Mn$_y$PO$_4$ carbon composite material following the milling to not less than 0.4 g/cc and not larger than 2.0 g/cc, in the synthesis of the LiFePO$_4$ carbon composite material as the cathode active material, the cathode active material free of an impurity may be produced. It may also be said that, by employing the so produced cathode active material, a non-aqueous electrolyte secondary cell may be produced which is of high capacity and of superior cyclic characteristics.

<Preparation of Test Cell Using Polymer Electrolyte>

Example B-19

A gelated electrode was prepared as follows: First, polyvinylidene fluoride, copolymerized with 6.9 wt % of hexafluoropropylene, a non-aqueous electrolyte and dimethyl carbonate, were mixed, agitated and dissolved to a sol-like electrolytic solution. To this sol-like electrolytic solution was added 0.5 wt % of vinylene carbonate VC to form a gelated electrolytic solution. As the non-aqueous electrolyte solution, such a solution obtained on mixing ethylene carbonate EC and propylene carbonate PC at a volumetric ratio of 6:4 and on dissolving $LiPF_6$ at a rate of 0.85 mol/kg in the resulting mixture was used.

A cathode was then prepared as follows: First, 95 parts by weight of the $LiFePO_4$ carbon composite material, prepared in Example B-2, 10 parts by weight of acetylene black, and 5 parts by weight of poly (vinylidene fluoride), in the form of fluorine resin powders, as a binder, were mixed together, and added to with N-methyl pyrrolidone to yield a slurry. This cathode mixture was coated on an aluminum foil, 20 μm in thickness, dried in situ under heating and pressed to form a cathode coating film. A gelated electrolytic solution then was applied to one surface of the cathode coating film and dried in situ to remove the solvent. The resulting product was punched to a circle 15 mm in diameter, depending on the cell diameter, to form a cathode electrode.

The anode then was prepared as follows: First, 10 wt % of fluorine resin powders, as a binder, were mixed into graphite powders, and added to with N-methyl pyrrolidone to form a slurry, which then was coated on a copper foil, dried in situ under heating and pressed to form an anode coating foil. On one surface of the anode coating foil was applied the gelated electrolytic solution and dried in situ to remove the solvent. The resulting product was punched to a circle 16.5 mm in diameter, depending on the cell diameter, to form an anode electrode.

The cathode, thus prepared, was charged into the cathode can, while the anode was held in the anode can. The anode can and the cathode can were caulked and secured together to complete a 2016 type coin-shaped lithium polymer cell having a diameter and a thickness of 20 mm and 1.6 mm, respectively.

Comparative Example B-3

A coin-shaped test cell was prepared in the same way as in Example B-19 except using the $LiFePO_4$ carbon composite material prepared in Comparative Example B-1 as cathode active material.

Comparative Example B-4

A coin-shaped test cell was prepared in the same way as in Example B-19 except using the $LiFePO_4$ carbon composite material prepared in Comparative Example B-2 as cathode active material.

On the polymer cells of Examples B-5 and Comparative Examples B-3 and B-4, prepared as described above, tests on charging/discharging characteristics, performed on the test cells employing the non-aqueous electrolyte solution, described above, were conducted in similar manner to measure the initial charging/discharging capacity and the capacity upkeep ratio following 50 cycles, to evaluate cell characteristics.

The measured results are shown, along with the tap density of the cathode active material, in Table B-2. The practically useful cell is required to be of the initial discharge capacity and the capacity upkeep ratio of not less than 140 mAh/g and not less than 80%, respectively, and preferably of not less than 150 mAh/g and not less than 90%, respectively.

TABLE B-2

| | tap density (g/cc) | decision by XRD | initial discharge capacity (mAh/g) | capacity upkeep ratio (%) |
|---|---|---|---|---|
| Ex. B-19 | 0.63 | ○ | 152.1 | 92.5 |
| Comp. Ex. B-3 | 0.35 | x | 120.2 | 76.5 |
| Comp. Ex. B-4 | 2.21 | ○ | 132.4 | 72.2 |

It may be seen from Table B-2 that, with the non-aqueous electrolyte cell of Example B-19, employing the cathode active material prepared by sitting the tap density following milling of the starting materials for synthesis of the $LiFePO_4$ carbon composite material to not less than 0.4 g/cc and not larger than 2.0 g/cc, the discharge capacity as well as cyclic characteristics is improved even in case of employing the gelated electrolyte in place of the non-aqueous electrolyte solution as the non-aqueous electrolyte.

What is claimed is:

1. A method for the preparing a cathode active material comprising:

a mixing step of mixing starting materials for synthesis of a compound represented by a general formula $Li_xFe_{1-y}M_yPO_4$, where M is at least one element selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$;

a milling step of milling a mixture obtained in said mixing step;

a compressing step of compressing the mixture milled in said milling step to a preset density; and a sintering step of sintering the mixture compressed in said compressing step, wherein a carbon material is added in any of the above steps previous to said sintering step, and wherein the preset density of said mixture in said compressing step is not less than 1.71 g/cm$^3$ and not larger than 2.45 g/cm$^3$.

2. A method for preparing a non-aqueous electrolyte cell having a cathode including a cathode active material, an anode including an anode active material and a non-aqueous electrolyte, wherein said cathode active material is produced by a mixing step of mixing starting materials for synthesis of a compound represented by a general formula $Li_xF_{1-y}M_yPO_4$, where M is at least one element selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, a milling step of milling a mixture obtained in said mixing step, a compressing step of compressing the mixture milled in the milling step to a preset density, and a sintering step of sintering the mixture compressed in said compressing step, wherein a carbon material is added in any of the above steps previous to said sintering step and wherein the preset density of said mixture in said compressing step is not less than 1.71 g/cm$^3$ and not larger than 2.45 g/cm$^3$.

3. The method for preparing the non-aqueous electrolyte cell according to claim 2 wherein a non-aqueous electrolyte is used as a solution of an electrolyte in a non-protonic non-aqueous solvent.

4. The method for preparing the non-aqueous electrolyte cell according to claim 2 wherein a polymer electrolyte is used as a solid electrolyte.

5. A method for preparing a cathode active material comprising:

a mixing step of mixing starting materials for synthesis of a compound represented by a general formula $Li_xFe_{1-y}$ $M_yPO_4$, where M is at least one element selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$; a milling step of milling a mixture obtained in said mixing step; and a sintering step of sintering the mixture milled in said milling step, wherein a carbon material is added in any of the above steps, and wherein, after said milling step, a tap density of the starting materials for synthesis is not less than 0.4 g/cc and not larger than 2.0 g/cc.

6. The method for preparing a cathode active material according to claim 5 wherein as the compound represented by the general formula $Li_xFe_{1-y}M_yPO_4$, a compound represented by the general formula $Li_xFePO_4$, where 0.05<x<1.2 is synthesized.

7. A method for preparing a non-aqueous electrolyte cell having a cathode including a cathode active material, an anode including an anode active material and a non-aqueous electrolyte wherein said cathode active material is produced by a mixing step of mixing starting materials for synthesis of a compound represented by a general formula LixFe1-yMyPO4, where M is at least one element selected from the group consisting of Mn, Cr, Co, Cu, Ni, V, Mo, Ti, Zn, Al, Ga, Mg, B and Nb, with 0.05 x 1.2, 0 y 0.8, a milling step of milling a mixture obtained in said mixing step, and a sintering step of sintering the mixture milled in said milling step, wherein a carbon material is added in any of the above steps, and wherein, after said milling step, a tap density of the starting materials for synthesis is not less than 0.4 g/cc and not larger than 2.0 g/cc.

8. The method for preparing the non-aqueous electrolyte cell according to claim 7 wherein as the compound represented by the general formula $Li_xFe_{1-y}M_yPO_4$, a compound represented by a general formula $Li_xFePO_4$, where 0.05<x<1.2, is synthesized.

9. The method for preparing the non-aqueous electrolyte cell according to claim 7 wherein a non-aqueous electrolyte is used as a solution of an electrolyte in a non-protonic non-aqueous solvent.

10. The method for the preparing the non-aqueous electrolyte cell according to claim 7 wherein a polymer electrolyte is used as a solid electrolyte.

* * * * *